US011905748B2

(12) United States Patent
Woodward et al.

(10) Patent No.: US 11,905,748 B2
(45) Date of Patent: Feb. 20, 2024

(54) RECESSED FENESTRATION HINGE ASSEMBLY AND METHOD FOR SAME

(71) Applicant: Marvin Lumber and Cedar Company, LLC, Eagan, MN (US)

(72) Inventors: Bradley David Woodward, Warroad, MN (US); Kyle C. Koch, Warroad, MN (US); Chase Voorhees, Roseau, MN (US)

(73) Assignee: Marvin Lumber and Cedar Company, LLC, Eagan, MN (US)

( * ) Notice: Subject to any disclaimer, the term of this patent is extended or adjusted under 35 U.S.C. 154(b) by 0 days.

(21) Appl. No.: 17/452,890

(22) Filed: Oct. 29, 2021

(65) Prior Publication Data

US 2022/0136296 A1 May 5, 2022

Related U.S. Application Data

(60) Provisional application No. 63/108,083, filed on Oct. 30, 2020.

(51) Int. Cl.
*E05D 7/06* (2006.01)
*E05D 5/00* (2006.01)
(Continued)

(52) U.S. Cl.
CPC .............. *E05D 3/022* (2013.01); *E06B 3/362* (2013.01); *E05D 2003/025* (2013.01)

(58) Field of Classification Search
CPC ... Y10T 16/553; Y10T 16/5535; E05D 3/022; E05D 2003/025; E06B 3/362
See application file for complete search history.

(56) References Cited

U.S. PATENT DOCUMENTS 1,083,622 A * 1/1914 Kusterer .................... E05D 3/02 16/379
1,103,607 A * 7/1914 Moore .................. E05D 7/0027 16/244

(Continued)

FOREIGN PATENT DOCUMENTS

CA 202086 10/2022
DE 102018115803 B3 * 5/2019 ............. E05D 5/023

(Continued)

OTHER PUBLICATIONS

"Canadian Application Serial No. 3,136,894, Office Action dated Jan. 9, 2023", 4 pgs.

(Continued)

*Primary Examiner* — Chuck Y Mah
(74) *Attorney, Agent, or Firm* — Schwegman Lundberg & Woessner, P.A.

(57) ABSTRACT

A fenestration hinge assembly includes a first leaf rotatably coupled with a second leaf. The first and second leaves each include one or more leaf knuckles. The first and second leaf knuckles are at least partially received within a hinge cavity of a recessed escutcheon, the recessed escutcheon configured for recessed installation within a panel or frame of a fenestration assembly. The fenestration hinge assembly includes a lateral adjustment plate movably coupled with a remainder of the second leaf. The lateral adjustment plate is configured to position at least a portion of the second leaf laterally relative to one of the frame or the panel. The fenestration hinge assembly includes an adjustable hinge configured for elevation adjustment. The adjustable hinge includes an elevation adjustment pin interconnecting the first and second leaf knuckles. The elevation adjustment pin is configured to position the second leaf vertically relative to the first leaf.

35 Claims, 12 Drawing Sheets

(51) Int. Cl.
*E05D 3/02* (2006.01)
*E06B 3/36* (2006.01)

(56) References Cited

U.S. PATENT DOCUMENTS

| | | | | | |
|---|---|---|---|---|---|
| 1,114,026 | A * | 10/1914 | Parsons | E05D 3/02 | 16/270 |
| 2,373,955 | A * | 4/1945 | Fuller | E05D 7/0423 | 126/194 |
| 2,611,921 | A * | 9/1952 | Weidelstam | E05D 7/0415 | 16/244 |
| 2,779,966 | A * | 2/1957 | Torchia | E05D 7/0027 | 16/244 |
| 3,545,031 | A * | 12/1970 | Dielman | E05F 1/063 | 16/314 |
| 3,564,771 | A * | 2/1971 | Reynolds | E05D 5/06 | 296/50 |
| 5,075,928 | A * | 12/1991 | Bobrowski | E05D 11/06 | 16/382 |
| 5,694,665 | A * | 12/1997 | Strickland | E05D 7/0423 | 16/237 |
| 5,713,105 | A * | 2/1998 | Toomey | E05D 7/0423 | 16/245 |
| 5,720,082 | A * | 2/1998 | Rossmo | E05D 7/02 | 16/244 |
| 5,933,919 | A * | 8/1999 | Miller | E05D 7/0018 | 16/244 |
| 6,212,734 | B1 * | 4/2001 | Commons | E05D 7/0027 | 16/244 |
| 8,375,517 | B1 * | 2/2013 | Johnsen | E05D 7/0027 | 16/244 |
| 10,458,165 | B1 * | 10/2019 | Tsai | E05D 7/04 | |
| 2005/0183238 | A1 * | 8/2005 | McCue | E05D 7/0027 | 16/236 |
| 2008/0104798 | A1 | 5/2008 | Hoppe et al. | | |
| 2008/0235910 | A1 * | 10/2008 | Umback | E05D 5/121 | 16/382 |
| 2011/0296652 | A1 * | 12/2011 | Zhang | E05D 7/04 | 16/239 |
| 2014/0047673 | A1 * | 2/2014 | Waddell | E05D 7/0027 | 16/387 |
| 2015/0330129 | A1 * | 11/2015 | Hendrickson, Jr. | E05D 7/00 | 16/244 |
| 2016/0047151 | A1 * | 2/2016 | Pelekanos | E05D 11/0054 | 16/237 |
| 2016/0201369 | A1 * | 7/2016 | Criddle | E05D 7/0045 | 16/238 |
| 2017/0247920 | A1 * | 8/2017 | Dolman | E05D 7/04 | |

FOREIGN PATENT DOCUMENTS

| | | | | | |
|---|---|---|---|---|---|
| JP | 09100670 | A * | 4/1997 | E05D 7/0027 |
| WO | WO-2020185057 | A2 * | 9/2020 | E05D 7/04 |

OTHER PUBLICATIONS

"Canadian Application Serial No. 3,136,894, Office Action dated May 30, 2023", 4 pgs.
"Canadian Application Serial No. 3,136,894, Response Filed Mar. 30, 2023 to Office Action dated Jan. 9, 2023", 17 pgs.

* cited by examiner

RECESSED FENESTRATION HINGE ASSEMBLY AND METHOD FOR SAME

PRIORITY APPLICATION

This application is a non-provisional of, and claims the priority of U.S. Patent Application Ser. No. 63/108,083, filed Oct. 30, 2020, the disclosure of which is incorporated herein in its entirety by reference.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright Marvin Lumber and Cedar Company, LLC d/b/a Marvin Windows and Doors of Eagan, MN All Rights Reserved.

TECHNICAL FIELD

This document pertains generally, but not by way of limitation, to rotatable couplings for fenestration assemblies including windows and doors.

BACKGROUND

Fenestration assemblies include one or more panels, such as sashes, door panels or the like. In some examples, casement window or door assemblies include inswinging or outswinging panels or sashes. In example door assemblies, door panels are rotatably coupled with door frames by one or more butt hinges coupled between the door panel and a jamb component of the door frame. Depending on the arrangement of the door panel, to swing inwardly or swing outwardly, the butt hinges including the hinge knuckles are installed proximate to the interior or exterior portion of the door frame.

With fenestration assemblies having one or more of large profile or heavy door panels or sashes multiple hinges are installed between the fenestration frame and the associated door panel or sash.

OVERVIEW

The present inventors have recognized, among other things, that a problem to be solved can include increasing support of fenestration panels (e.g., doors or sashes) while at the same time minimizing the profile of supporting features, such as hinges, and providing features to facilitate adjustment of the panels. In some examples, the minimizing of support feature profiles, including hinges, is counter to enhancing support of fenestration panels.

Fenestration assemblies, including door assemblies, include multiple butt hinges that rotatably couple door panels with the surrounding door frame. In at least some door assemblies multiple hinges are coupled between the door panel and the door frame. For instance, residential doors include at least upper, lower and middle hinges between the door panel and door frame. The hinges support the weight of the door panel, maintain alignment of the door, and facilitate rotatable opening and closing of the door. As one or more of the profile or weight of the door increases additional hinges are included to better support the weight of the door. Because the hinge axis of rotation is spaced from the door frame and door panel to facilitate rotation the weight of the door applies a torque to the hinge, associated fasteners and the like based on the weight of the door panel and the moment arm between the hinge axis of rotation and each of the fasteners that couple the hinge with the door frame. Similarly, torque is applied to the fasteners that couple the hinge with the door panel. The forces (including torque) experienced by the hinges and associated fasteners are increased as the size and profile of the door panel increase, thereby prompting the installation of additional hinges. In some examples, with doors that are 10 feet or greater in length or constructed with robust materials (e.g., metals, solid wood or the like) multiple hinges are installed at increments along the door assembly. With door assemblies that include a clean, smooth, sleek, decorative or ornamental appearance (collectively, aesthetic appearance) the increased hinge count provides features that distract from the otherwise specified aesthetic appearance of the door assembly.

Additionally, the adjustment of door panels including butt hinges involves the decoupling of the hinges, usually one at a time, and inserting shims between hinge plates and either or both of the associated portions of the door panel or door frame. For instance, in a door assembly including upper, lower and middle butt hinges the upper hinge is decoupled while the lower and middle hinges remain coupled, Shims are inserted to adjust the upper hinge (e.g., for leveling of the door panel, decreasing binding of the hinge or the like), and the upper hinge is then fastened into place. The process is repeated for the middle hinge with the upper and lower hinges remaining fastened, the middle hinge unfastened and shimmed, and then refastened after being shimmed. Finally, the process is repeated again for the lower hinge (e.g., with the upper and middle hinges remaining fastened). This process is time intensive, repetitive and laborious. Additionally, some example fenestration assemblies may include two hinges and the decoupling of one hinge for adjustment while the other hinge remains coupled is difficult without a brace, jack or the like to support the weight and torque the door panel applies to the coupled hinge.

The present subject matter can help provide a solution to this problem, for instance with a recessed adjustable hinge assembly that robustly supports the door panel, minimizes the hinge profile (relative to previous hinges), while at the same time providing ready access to adjustment features that facilitate adjustment of the door panel during use without complex, staggered decoupling and adjustment of component hinges.

The fenestration assemblies described herein include recessed hinge assemblies that minimize the profile of the hinge relative to the remainder of the fenestration assembly. For instance, the hinge including one or more knuckles is at least partially recessed into at least one of the fenestration panel, frame or the like. As shown herein, a recessed escutcheon is coupled with the fenestration assembly (e.g., the panel) and receives at least a portion of the hinge profile in a hinge cavity of the escutcheon. For instance, an interior hinge component of the hinge assembly is within the profile of the fenestration assembly as well as within the recessed escutcheon. Positioning of the hinge assembly within the fenestration assembly profile minimizes distraction from the smooth, clean or sleek ornamental appearance of the fenestration assembly.

Additionally, by recessing the hinge assembly toward the remainder of the fenestration assembly, for instance into the hinge cavity of the recessed escutcheon the moment arm between the fenestration panel and the fenestration frame is minimized. Example butt hinges include the rotation axis of the butt hinge remote (e.g., not recessed) relative to the fenestration panel and frame to permit clearance for opening and closing of the panel. The remote rotation axis, (relatively) wide leaves and the like generate large torque values in combination with the weight of the fenestration panel on the butt hinges and fasteners (screws, bolts or the like) coupling the butt hinges with the fenestration frame. The weight and torque over time may cause wear and damage to one or more of the fasteners, frame or hinges. Accordingly, one or more of additional or larger butt hinges are installed to offset torque and weight load.

The present hinge assemblies described herein position the hinge in relatively closer proximity to the fasteners connecting the hinges with the fenestration panel and the fenestration frame. For instance, the hinge is positioned at least partially within the profile of the fenestration panel, frame or like, and the associated rotation axis of the hinge assemblies is positioned proximate to the fasteners (e.g., with less wide leaves). The resulting moment arms are decreased, and the torque applied to the fasteners for the hinges is decreased. Accordingly, one or both of fewer or smaller hinge assemblies are installed with the fenestration assembly in comparison to example butt hinges.

Further still, even with the recessed hinges described herein, the hinge assemblies are readily adjusted without decoupling the hinge assemblies from the fenestration panel or the fenestration frame. In one example, the hinge assemblies include an elevation adjustment pin. The elevation adjustment pin is provided within the hinge in one example. Adjustment of the elevation pin (e.g., rotation with an Allen wrench, driver or the like) vertically moves a leaf of the hinge relative to the other leaves. For instance, a second leaf and its associated fenestration panel are adjusted up or down relative to the first leaf (e.g., upper and lower first leaves) coupled with the fenestration frame. As shown herein, the elevation adjustment pin is accessible to permit adjustment even with the recessed hinges installed with the fenestration assembly.

In another example, the hinge assemblies described herein include lateral adjustment features to permit lateral adjustment of the fenestration panel. The hinge assembly includes a lateral adjustment jack coupled with the second leaf of the assembly associated with the fenestration panel. An operator actuates the lateral adjustment jack (e.g., with an Allen wrench, driver or the like) to move the jack relative to the second leaf. Movement of the jack expands and contracts leaf, and accordingly laterally moves the fenestration panel. Optionally, a movable adjustment plate is coupled with the second leaf and engaged with the fenestration panel. The adjustable plate is moved with actuation of the lateral adjustment jack. In one example, the fenestration panel remains coupled with the second leaf while adjustment is conducted with the lateral adjustment jack and the adjustment plate. Expansion or contraction of the second leaf with the jack corresponding moves the fenestration panel laterally, for instance to adjust the panel within the frame to provide specified reveals, alignment of the door to a companion (double) door, alignment of door latches and keepers or the like.

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
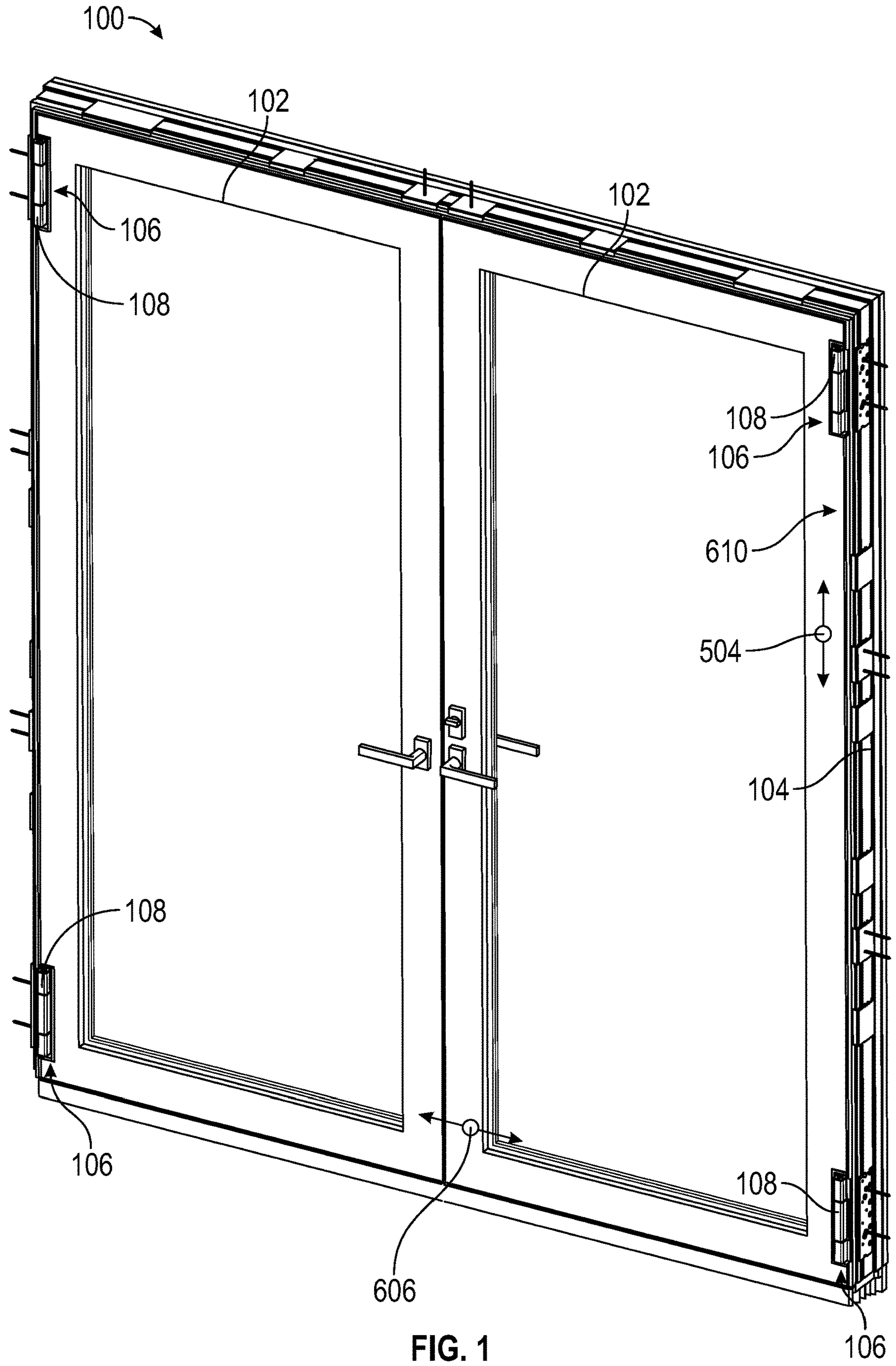
FIG. 1 is a perspective view of one example of a fenestration assembly.

FIG. 1 is a perspective view of one example of a fenestration assembly 100. The fenestration assembly 100 includes a window, door or the like including a movable fenestration panel 102, such as a window sash or door panel. The fenestration assembly 100 further includes a fenestration frame 104, and the fenestration panel 102 is movably coupled with the frame 104. The fenestration assembly 100 includes one or more fenestration panels 102 coupled with the frame 104. In the example shown in FIG. 1 the fenestration assembly 100 includes two fenestration panels 102 rotatably coupled with the fenestration frame 104.

The fenestration panels 102 are coupled with the fenestration frame 104 with one or more fenestration hinge assemblies 106 (herein hinge assembly). The fenestration hinge assemblies 106 rotatably couple the fenestration panels 102 with the fenestration frame 104 and permit movement of the panels 102 between open and closed configurations and intermediate configurations therebetween. As further described herein the hinge assemblies 106 are at least partially concealed within the fenestration assembly 100. For instance, portions of the hinge assemblies 106 are recessed relative to the visible or exterior portions of the fenestration assembly 100 while permitting full opening and closing movement.

In other examples, the hinge assemblies 106 robustly couple the fenestration panels 102 with the fenestration frame 104 in a manner that minimizes the number and size of hinge assemblies otherwise used, for instance in other fenestration assemblies. Instead, as shown in FIG. 1, first and second hinge assemblies 106 are provided with each of the panel 102 in contrast to three or more hinge assemblies used in other fenestration assemblies to support the fenestration panels 102. Accordingly, through one or more of concealment within the assembly 100, and robust coupling of the panels 102 to the frame 104 or the like the hinge assemblies 106 shown in FIG. 1 and described herein minimize interruption of the smooth, sleek and clean aesthetic of the fenestration assembly 106.

FIG. 1 illustrates that each of the hinge assemblies 106 optionally includes an adjustable hinge 108. As discussed herein, the adjustable hinge 108 permits one or more of elevation and lateral adjustment of the hinge assemblies 106 and the associated fenestration panels 102. Further, the adjustments provided with the hinge assemblies 106 and the associated adjustable hinges 108 are conducted with the fenestration panels 102 and fenestration frame 104 coupled with the hinge assemblies 106. Accordingly, time consuming and laborious decoupling of hinges, support of the fenestration panels 102 or the like are minimized. Instead, the hinge assemblies 106 having the adjustable hinges 108 are readily adjusted in situ with the fenestration panels 102.

Figure 2A:
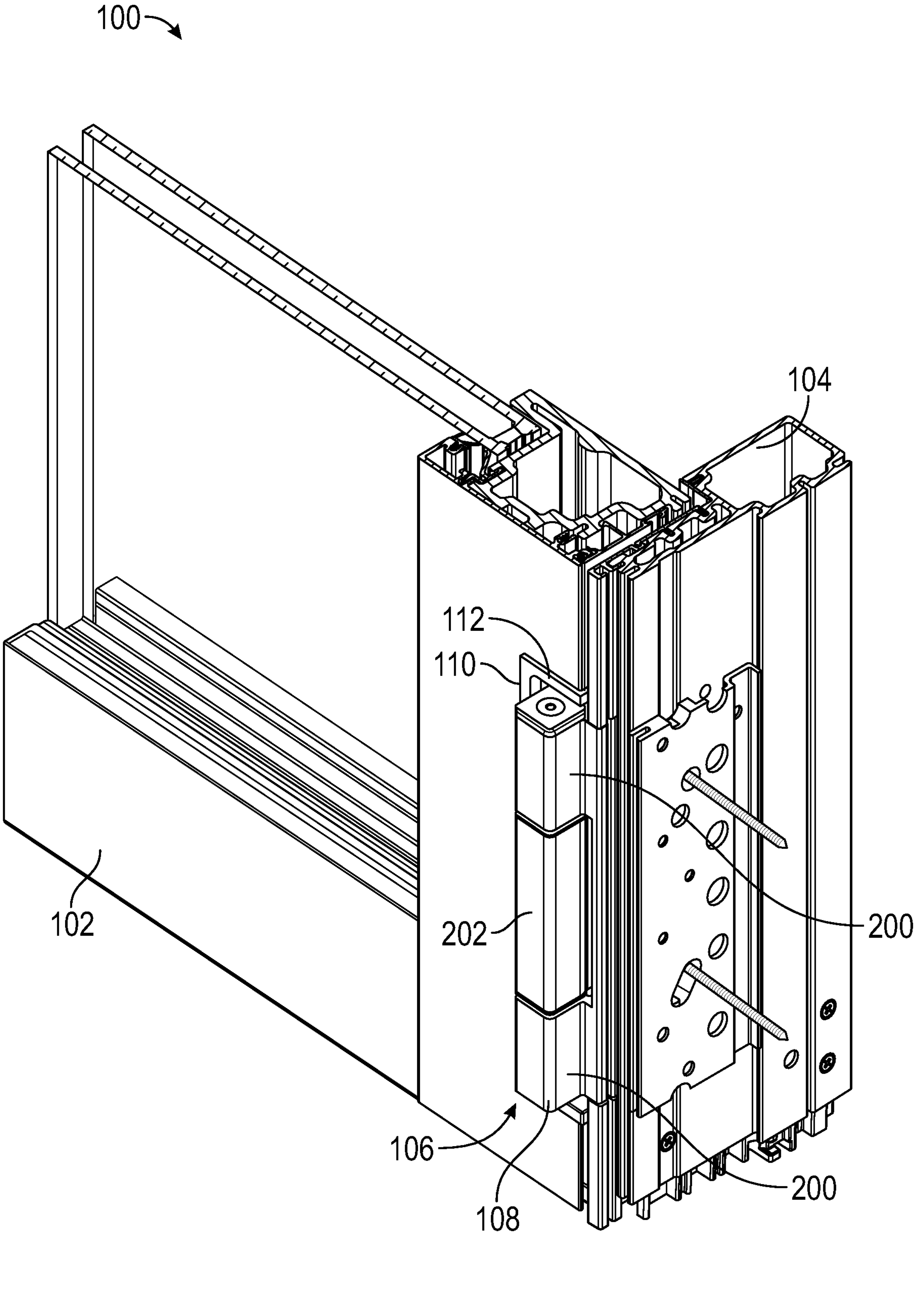
FIG. 2A is a perspective view of the fenestration assembly of FIG. 1 having an example inswing fenestration hinge assembly.

FIG. 2A is a detailed perspective view of one example of the fenestration assembly 100 previously described and shown in FIG. 1. In this view, the fenestration assembly 100 is shown, for instance, including an example of a fenestration hinge assembly 106, such as an in-swing fenestration hinge assembly. As shown, the fenestration hinge assembly 106 includes a hinge 108. In some examples the hinge 108 is an adjustable hinge. As will be described herein, the adjustable hinge 108 provides one or more adjustable features including, for instance, one or more of elevation adjustment, lateral adjustment or the like to permit positioning of a portion of the adjustable hinge 108 and the associated fenestration panel 102 relative to the fenestration frame 104 and other components of the hinge assembly 106.

Referring again to FIG. 2A, the hinge assembly 106 is shown with the hinge 108 including, for instance, a first leaf knuckle 200 rotatably coupled with a second leaf knuckle 202. In this example, the hinge 108 includes upper and lower first leaf knuckles 200 and an intervening or intermediate second leaf knuckle 202 rotatably coupled with upper and lower first leaf knuckles 200. The first leaf knuckle 200 and second leaf knuckle 202 are coupled together, for instance, with a pin such as the adjustment pin described herein. The first and second leaf knuckles 200, 202 permit rotational movement of the fenestration panel 102 relative to the fenestration frame 104.

In one example, the fenestration hinge assembly 106 includes a recessed escutcheon 110. The recessed escutcheon 110 provides a hinge cavity 112 that receives at least a portion of the hinge 108 including one or more of the first and second leaf knuckles 200, 202. The hinge cavity 112 of the recessed escutcheon 110 receives the first and second leaf knuckles 200, 202 and permits rotation of the first and second leaf knuckles 200, 202 relative to each other, for instance, during opening and closing movement of the fenestration panel 102. Reception of the hinge 108, such as a portion of the hinge, within the hinge cavity 112 minimizes the overall profile of the hinge 108 relative to the remainder of the fenestration assembly 100. Additionally, the rotation axis of the hinge 108 is positioned in proximity to fasteners coupling the hinge assembly 106 with the panel 102 and the frame 104, thereby minimizing torque or moment loads from the panel 102 to the frame 104. Accordingly, the hinge 108 robustly supports the fenestration panel 102 and at the same time has a decreased profile through reception of the hinge 108 within the recessed escutcheon 110 and concealment of the hinge 108 (e.g., partially or fully).

In another example, the recessed escutcheon as well as the hinge cavity 112 permits the rotation of one or more features of the hinge 108 including, for instance, the square profile first or second leaf knuckles 200, 202 relative to one or more of the fenestration panel 102 and fenestration frame 104. Accordingly, as the fenestration panel 102 is opened, the square knuckles, for instance, of the first leaf knuckle 200 are permitted to rotate within the recessed escutcheon 110. In a similar manner, the second leaf knuckles 202 static relative to the fenestration panel 102 and the escutcheon 110 rotate relative to the fenestration frame 104. Accordingly the hinge cavity 112 of the recessed escutcheon 110 permits movement of the knuckles 200, 202 even while the knuckles 200, 202 are positioned with the profile of the fenestration panel 102 and the frame 104.

With recessing of at least a portion of the hinge 108 within the recessed escutcheon 110, a robust hinge 108 is provided for the fenestration assembly 100 while at the same time concealing the hinge 108 (partially or fully) and minimizing the profile of the hinge 108 relative to the fenestration assembly 100. As discussed herein, the hinge assembly 106 robustly supports the fenestration panel 102 and permits the installation of a decreased number of fenestration hinge assemblies 106 relative to similar fenestration assemblies to further minimize the profiles of the hinge assemblies 106 relative to the fenestration assembly 100. For instance, as shown in FIG. 1, upper and lower fenestration hinge assemblies 106 are provided with the fenestration panel 102 in contrast to an example arrangement with three or more hinge assemblies provided between the fenestration panel and the frame.

Figure 2B:
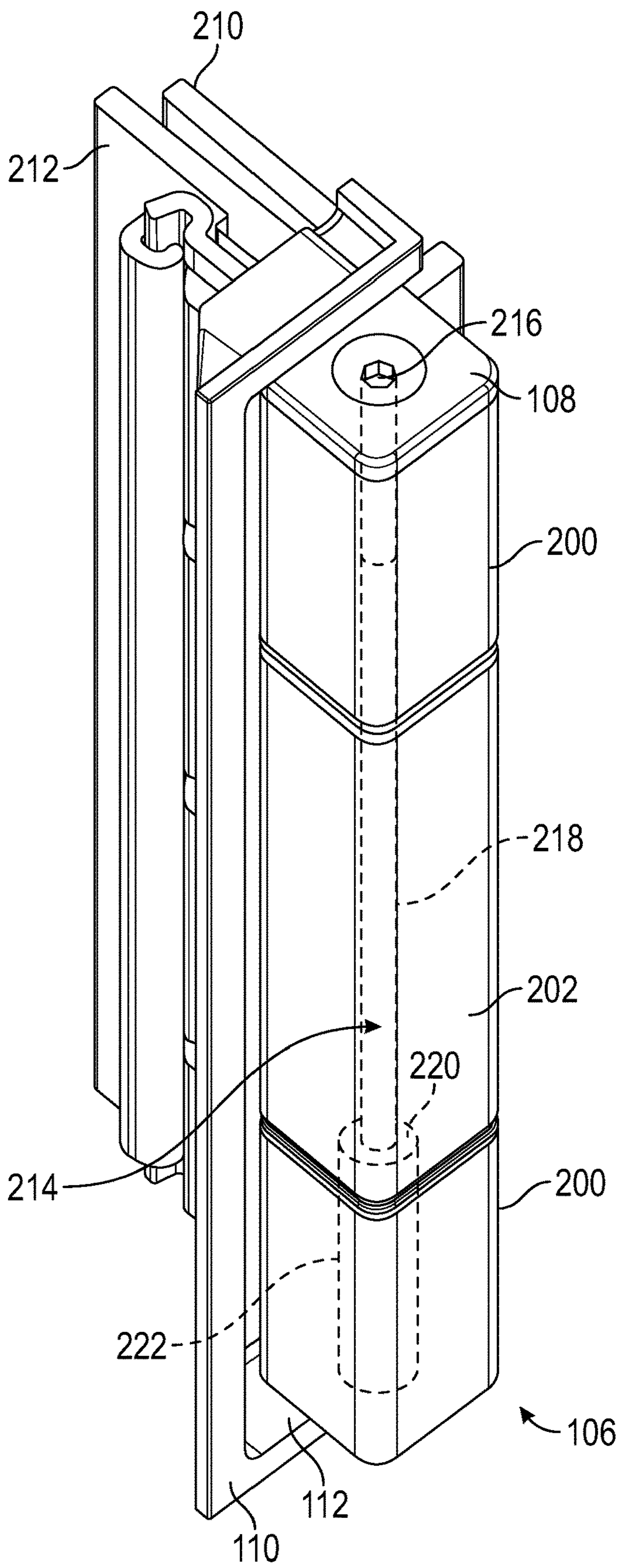
FIG. 2B is a detailed perspective view of the fenestration hinge assembly of FIG. 2A.

FIG. 2B is a detailed perspective view of the fenestration hinge assembly 106 shown in FIG. 2A. In this example, the fenestration hinge assembly 106 is decoupled from the remainder of the fenestration assembly 100 previously described and shown herein. The fenestration hinge assembly 106 includes the hinge 108 having, for instance, first and second leaf knuckles 200, 202. As shown in the view provided in 2B, the first leaf knuckles 200 are coupled with a first leaf 210. The first leaf 210 includes one or more recesses, openings or the like for fasteners to couple the first leaf 210 with a component of the fenestration assembly 100, such as the fenestration frame 104. Conversely, the second leaf 212 is coupled with the second leaf knuckle 202. The second leaf 212 includes one or more openings, orifices or the like for fasteners to facilitate coupling of the second leaf 212 with another component of the fenestration assembly 100, such as the fenestration panel 102. The first and second leaf knuckles 200, 202 are coupled together with a pin 214, such as the elevation adjustment pin 214 shown in broken lines in FIG. 2B. The pin 214 permits rotational movement of the second leaf 212 relative to the first leaf 210 and accordingly permits rotation of the fenestration panel 102 relative to the fenestration frame 104. As will be described herein, the pin 214, in another example, as an elevation adjustment pin provides an adjustment function to facilitate elevational movement of the second leaf knuckle 202 (and the associated panel 102) relative to the first leaf knuckle 200 including, for instance, the upper and lower first leaf knuckles 200 shown in FIG. 2B.

As further shown in FIG. 2B, the hinge assembly 106 further includes the recessed escutcheon 110 having the hinge cavity 112 surrounding a portion of the hinge assembly 106 and receiving a portion of the hinge assembly 106 therein. For instance, as shown in FIG. 2B, the hinge cavity 112 of the recessed escutcheon 110 receives at least a portion of the hinge 108 and facilitates rotation of the hinge 108 in each of the open, closed and transitional positions or configurations of the fenestration panel 102.

Referring again to FIG. 2B, the pin 214 is optionally an elevation adjustment pin 214 coupled between the first and second leaf knuckles 200, 202. As shown, the elevation adjustment pin 214 extends through each of the knuckles 200, 202. In the example shown in FIG. 2B the elevational adjustment pin 214 includes a pin body 222 rotatably received within the first leaf knuckle 200, for instance the lower first leaf knuckle 200 shown in FIG. 2B. As will be described herein, the pin body 222 optionally includes a socket or other feature configured for receipt of a tool such as a hex head, Allen wrench, driver or the like to change the elevation of the adjustment pin relative to the first leaf knuckle 200. In one example, the first leaf knuckle 200 includes a passage, recess or the like having a threaded or other graduated coupling (e.g., a graduated interface) to facilitate relative elevational movement of the pin body 222 to move a bearing surface 220 relative to the first leaf knuckle 200. The bearing surface 220 of the pin body 222 is engaged with (optionally with an intervening bushing) the second leaf knuckle 202. Accordingly, movement of the pin body 222, for instance through adjustment by way of a socket or the like provided with the pin body 222, moves the bearing surface 220 up or down and thereby accordingly positions the second leaf knuckle 202, the second leaf 212 and the fenestration panel 102 coupled with the second leaf 212 in an elevating manner relative to the remainder of the hinge assembly 106. For instance, with upward movement of the pin body 222 relative to the first leaf knuckle 200, the bearing surface 220 biases the second leaf knuckle 202 in an upward manner and thereby also biases the second leaf 212 and the fenestration panel 102 in an upward manner relative to the first leaf 210 and the fenestration frame 104.

As further shown in FIG. 2B, a support bridge 218 of the adjustment pin 214 extends through the second leaf knuckle 202, for instance, through a passage of the second leaf knuckle 202 into the upper first leaf knuckle 200. The support bridge 218 facilitates the rotatable coupling of the first leaf knuckle 200 relative to the second leaf knuckle 202. Additionally, as shown in broken lines, the elevation adjustment pin 214 extends into the upper first leaf knuckle 200 and is optionally coupled with an elevation lock 216. The elevation lock 216 is provided with the upper first leaf knuckle 200. As will be shown herein, in one example, the elevation lock 216 is configured to couple with the support bridge 218 and lock the adjustment pin 214 in its location and optionally distribute load from the lower first leaf knuckle 200 to the upper first leaf knuckle 200. In one example, the elevation lock 216 locks the pin body 222 in its adjusted position for coupling with the support bridge 218.

In another example, the elevation lock 216 couples with the support bridge 218 and loads the support bridge 218 in tension to distribute load between the upper and lower first leaf knuckles 200 that is otherwise carried by the lower first leaf knuckle 200. For example, the elevation lock 216 includes a socket, tool feature or the like configured for receipt of a tool such as a hex head, Allen wrench, screwdriver or the like that permits rotatable coupling (e.g., by way of threads, interfitting features or the like) with the support bridge 218. The elevation lock 216 is also coupled with the upper first leaf knuckle 200 and the distributed load from the support bridge 218 to the lock 216 is transmitted to the upper first leaf knuckle 200 to enhance support of the second leaf knuckle 202 and the panel 102. In this manner, the elevation lock 216 in combination with the remainder of the elevation adjustment pin 214 is configured to distribute the load of the fenestration panel 102, the second leaf 212 and the second knuckle 202 to each of the upper and lower first leaf knuckles 200. The fenestration hinge assembly 106 is thereby able to robustly support the second leaf knuckle 202, the second leaf 212 and the fenestration panel 102.

Figure 2C:
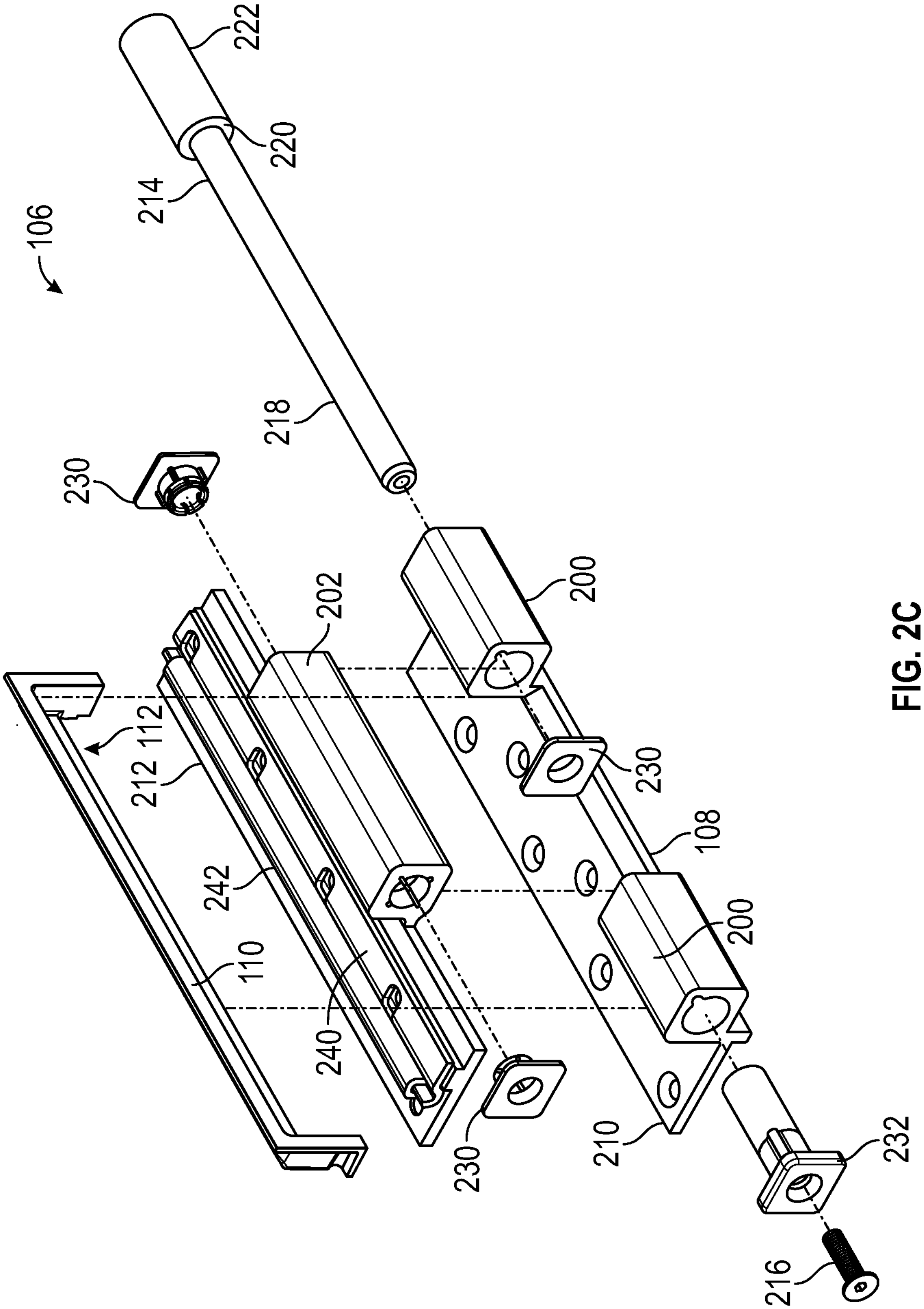
FIG. 2C is an exploded view of the fenestration hinge assembly of FIG. 2A.

FIG. 2C is an exploded view of the fenestration hinge assembly 106 previously shown in FIGS. 2A and 2B, an example of an in-swing hinge assembly. As shown, the fenestration hinge assembly is decoupled with the first leaf 210 decoupled from the second leaf 212 and the first and second leaf knuckles 200, 202 are exploded to show one or more orifices, recesses, or the like configured for reception of the pin 214 therein (an elevation adjustment pin in some examples). Positioning of the pin 214 within the respective orifices of the first and second leaf knuckles 200, 202 rotatably couples the first and second leaves 210, 212 together and provides rotatable coupling for the fenestration panel 102 to move relative to the fenestration frame 104 as shown in FIG. 1.

The escutcheon 110 is spaced from the first and second leaf knuckles 200, 202 to illustrate the profile of the knuckles. The escutcheon 110 includes the hinge cavity 112 configured for reception of the first and second leaf knuckles 200, 202 that permits movement of the knuckles 200, 202. In the example shown in FIG. 2C the escutcheon walls that surround the hinge cavity 112 are configured to receive a portion of the first and second leaf knuckles 200, 202, such as an interior hinge portion. In other examples, the escutcheon walls are configured to provide a deeper (or shallower) hinge cavity 112 configured to receive a corresponding portion of the knuckles 200, 202, up to and including the entirety of the knuckles 200, 202. As described herein, recessing the hinge 108 including the knuckles 200, 202 of the hinge assembly 106 minimizes the profile of the hinge assembly 106 while at the same time moving the rotation axis into proximity with the leaves 210, 212 and the associated fasteners in a manner that enhances support provided by the hinge assembly 106 to support the fenestration panel 102.

As shown in FIG. 2C, the pin 214, as an elevation adjustment pin 214 in this example, includes the pin body 222 with a socket for receipt of a tool such as a hex head, Allen wrench, screwdriver or the like to change the elevation of the adjustment pin 214 relative to one or more of the knuckles, such as the first leaf knuckle 200. In one example, the first (lower) leaf knuckle 200 includes a graduated interface such as a threading, interfitting features or the like to translate rotation of the pin body 222 into elevation movement of the pin body 222 relative to the first leaf knuckle 200.

As further shown in FIG. 2C the pin body 222, in this example, includes the bearing surface 220. Adjustment of the pin body 222 changes the bearing surface elevation, for instance, relative to the first leaf knuckle 200 and correspondingly changes the elevation of the second leaf knuckle 202 relative to the first leak knuckle 200. As described herein, the second leaf 212 is, in one example, coupled with the fenestration panel 102 and accordingly elevation of the pin body 222 and the associated bearing surface 220 positions the second leaf knuckle 202 and the fenestration panel 102 coupled with the second leaf knuckle 202 by way of the second leaf 212.

In one example, one or more knuckle bushings 230 are interposed between the pin body 222 and the second leaf knuckle 202 to facilitate rotation, wear resistance or the like between the components. For instance, the bearing surface 220 is configured to directly engage with the knuckle bushing 230 and position the second leaf knuckle 202 by positioning the intervening knuckle bushing 230. In another example, one or more knuckle bushings 230 are interposed between the upper portion of the second leaf knuckle 202 and the lower portion of the upper first leaf knuckle 200. The knuckle bushings 230 are shown in FIG. 2C interposed between the upper and lower first leaf knuckles 200 and exploded relative to the second leaf knuckle 202.

Referring again to FIG. 2C, in another example, the upper first leaf knuckle 200 shown in the left portion of FIG. 2C, includes a support bushing 232 configured for reception within the upper first leaf knuckle 200. In this example, the support bushing 232 couples with the elevation lock 216 and distributes an axial load received from the elevation lock 216 and the pin 214 (loaded in tension with coupling of the elevation lock 216 to the support bridge 218) to the upper first leaf knuckle 200. The load from the second leaf 212 such as the weight and torque of the fenestration panel 102 is thereby carried by the upper and lower first leaf knuckles 200. The lower first leaf knuckle 200 carries load through coupling with the pin body 222 (described herein) while the upper first leaf knuckle carries load with coupling of the support bridge 218 to the upper first leaf knuckle 200 by way of the elevation lock 216 and the optional intervening support bushing 232.

Referring again to FIG. 2C, in another example, the hinge assembly 106 includes another adjustable feature including, for instance, a lateral adjustment feature. In this example, the second leaf 212 includes an adjustment plate 240 moveably coupled with the second leaf 212. The adjustment plate 240 is moveably coupled with the second leaf 212. For instance, a retention flange 242 is provided along the second leaf 212 to retain the adjustment plate 240 with the leaf 212 during installation of the hinge assembly 106 with the fenestration panel 102.

As described herein, in one example, the adjustment plate 240 is configured to rotate or move relative to the retention flange 242 and accordingly expand or contract the profile of the second leaf 212 to correspondingly move the fenestration panel 102 coupled with the second leaf 212. The adjustment plate 240 provides a surface configured for engagement with one or more set screws, adjustment jacks or the like configured to engage with the adjustment plate 240 and expand or contract the profile of the second leaf 212 for adjustment of the fenestration panel 102 laterally.

Figure 3A:
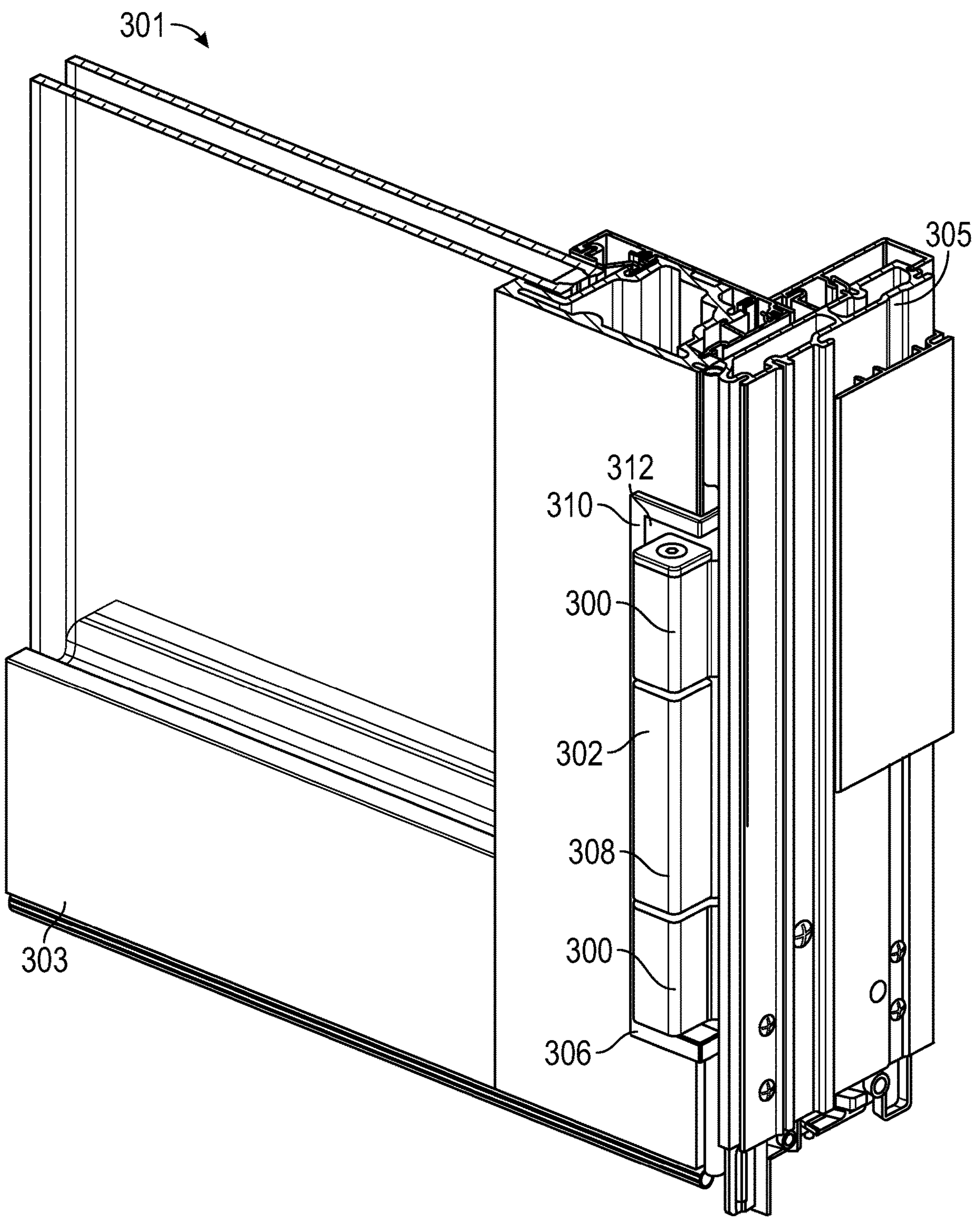
FIG. 3A is a perspective view of a fenestration assembly having another example fenestration hinge assembly, in this example an outswing assembly.
Figure 3B:
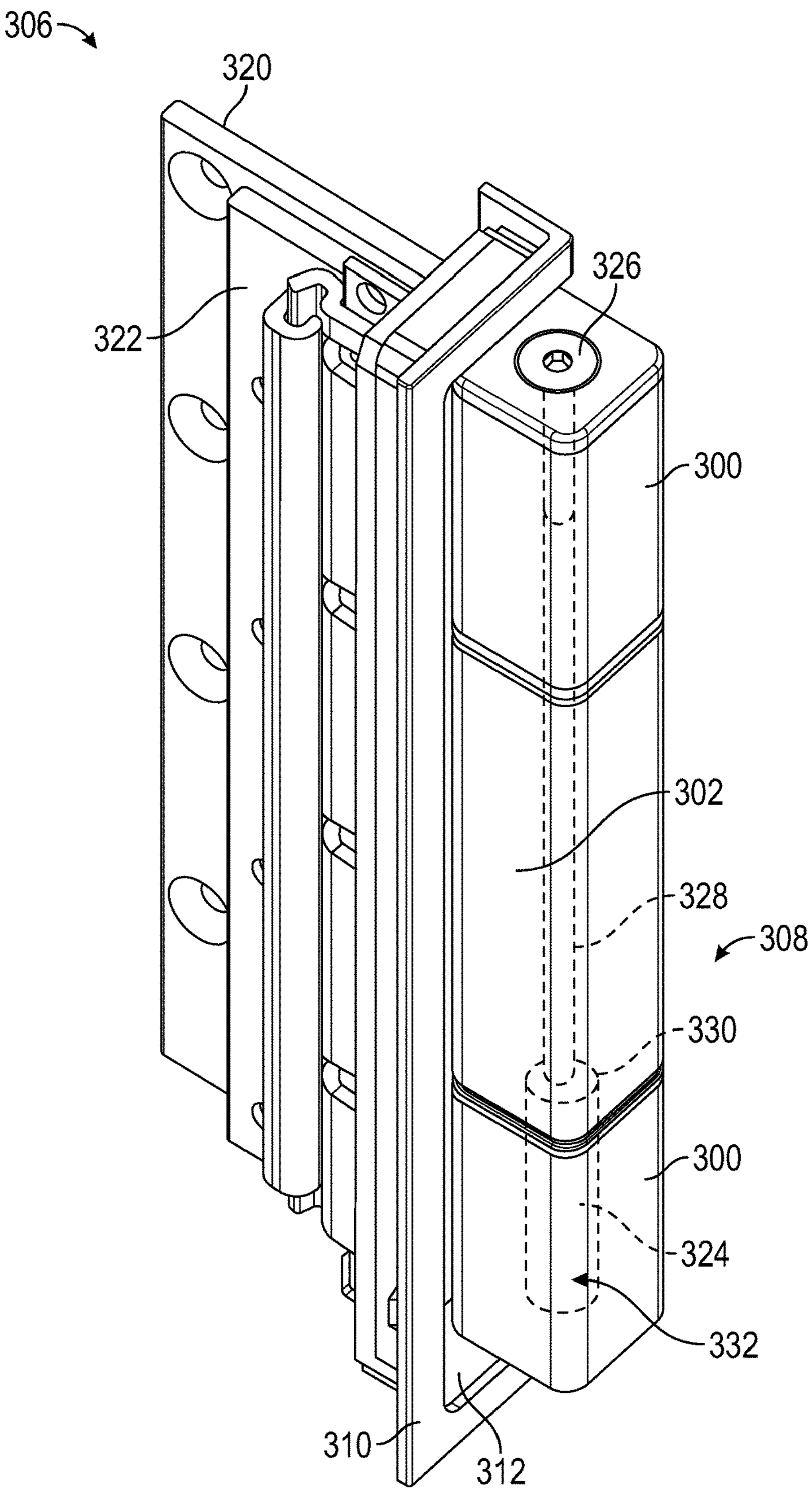
FIG. 3B is a detailed perspective view of the fenestration hinge assembly of FIG. 3A.
Figure 3C:
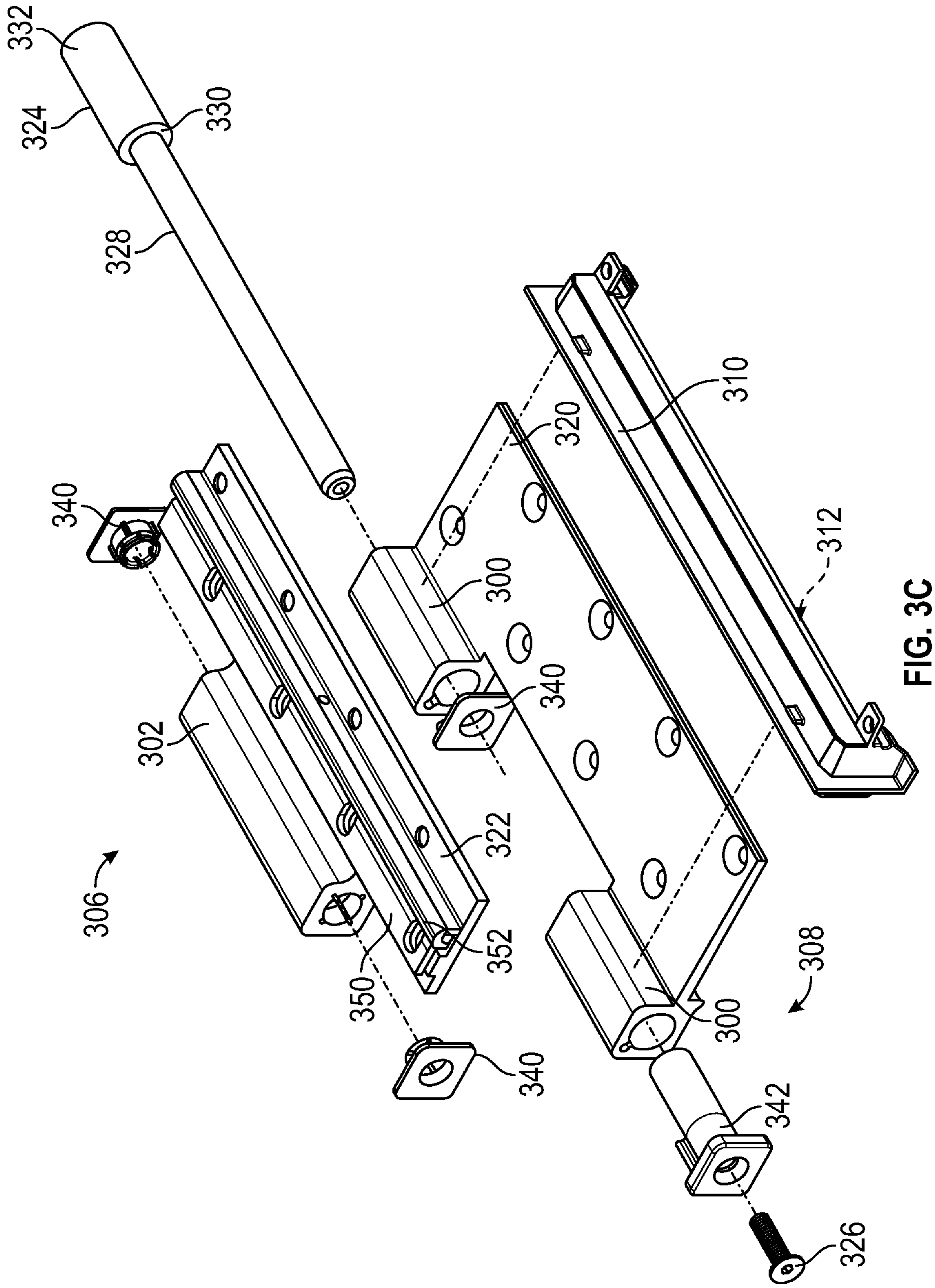
FIG. 3C is an exploded view of the fenestration hinge assembly of FIG. 3A.

FIGS. 3A-3C are detailed views of another example of the fenestration assembly 100 and an out-swing hinge assembly 306 (in contrast to the in-swing hinge assembly 106 shown in FIGS. 2A-2C). As shown, the fenestration hinge assembly 306 includes a hinge 308. In some examples the hinge 308 is an adjustable hinge.

Referring to FIG. 3A, the hinge assembly 306 is shown with the hinge 308 including, for instance, a first leaf knuckle 300 rotatably coupled with a second leaf knuckle 302. In this example, the hinge 308 includes upper and lower first leaf knuckles 300 and an intervening or intermediate second leaf knuckle 302 rotatably coupled with upper and lower first leaf knuckles 300.

The fenestration hinge assembly 306, like the assembly 106, includes a recessed escutcheon 310. The recessed escutcheon 310 provides a hinge cavity 312 that receives at least a portion of the hinge 308 including one or more of the first and second leaf knuckles 300, 302. The hinge cavity 312 of the recessed escutcheon 110 receives the first and second leaf knuckles 300, 302 and permits rotation of the first and second leaf knuckles 300, 302 relative to each other, for instance, during opening and closing movement of the fenestration panel 303. In a similar manner to the hinge assembly 106 and the hinge 108, the hinge 308 of the hinge assembly 306 robustly supports the fenestration panel 303 and at the same time has a decreased profile through reception of the hinge 308 within the recessed escutcheon 310 and concealment of the hinge 308 (e.g., partially or fully).

FIG. 3B is a detailed perspective view of the fenestration hinge assembly 306 shown in FIG. 3A. In this example, the fenestration hinge assembly 306 is decoupled from the remainder of the fenestration assembly 301 previously described and shown herein. As shown in FIG. 3B, the first leaf knuckles 300 are coupled with a first leaf 320. The first leaf 320 includes one or more recesses, openings or the like for fasteners to couple the first leaf 320 with a component of the fenestration assembly 100, such as the fenestration frame 305 (see FIG. 3A), Conversely, the second leaf 322 is coupled with the second leaf knuckle 302. The first and second leaf knuckles 300, 302 are coupled together with a pin 324, such as the elevation adjustment pin 324 shown in broken lines in FIG. 3B. The pin 324 permits rotational movement of the second leaf 322 relative to the first leaf 320 and accordingly permits rotation of the fenestration panel 303 relative to the fenestration frame 305 of the assembly 301. As will be described herein, the pin 324, in another example, as an elevation adjustment pin provides an adjustment function to facilitate elevational movement of the second leaf knuckle 302 (and the associated panel 303) relative to the first leaf knuckle 300 including, for instance, the upper and lower first leaf knuckles 300 shown in FIG. 3B.

As further shown in FIG. 3B, the hinge assembly 306 further includes the recessed escutcheon 310 having the hinge cavity 312 surrounding a portion of the hinge assembly 306 and receiving a portion of the hinge assembly 306 therein. For instance, as shown in FIG. 3B, the hinge cavity 312 of the recessed escutcheon 310 receives at least a portion of the hinge 308 and facilitates rotation of the hinge 308 in each of the open, closed and transitional positions or configurations of the fenestration panel 303.

Referring again to FIG. 3B, in a similar manner to the pin 214 (in FIGS. 2A-C) the pin 324 is optionally an elevation adjustment pin 324 coupled between the first and second leaf knuckles 300, 302. In the example shown in FIG. 3B the elevational adjustment pin 324 includes a pin body 332 rotatably received within the first leaf knuckle 300, for instance the lower first leaf knuckle 300 shown in FIG. 3B. In one example, the first leaf knuckle 300 includes a passage, recess or the like having a threaded or other graduated coupling (e.g., a graduated interface) to facilitate relative elevational movement of the pin body 332 to move a bearing surface 330 relative to the first leaf knuckle 300. The bearing surface 330 of the pin body 332 is engaged with (optionally with an intervening bushing) the second leaf knuckle 302. Accordingly, movement of the pin body 332, for instance through adjustment by way of a socket or the like provided with the pin body 332, moves the bearing surface 330 up or down and thereby accordingly positions the second leaf knuckle 302, the second leaf 322 and the fenestration panel 303 coupled with the second leaf 322 in an elevating manner relative to the remainder of the hinge assembly 306.

As further shown in FIG. 3B, a support bridge 328 of the adjustment pin 324 extends through the second leaf knuckle 302, for instance, through a passage of the second leaf knuckle 302 into the upper first leaf knuckle 300. The support bridge 328 facilitates the rotatable coupling of the first leaf knuckle 300 relative to the second leaf knuckle 302. Additionally, an elevation lock 326 is optionally provided with the upper first leaf knuckle 300. As shown herein, the elevation lock 326 is configured to couple with the support bridge 328 and lock the adjustment pin 324 in its location and optionally distribute load from the lower first leaf knuckle 300 to the upper first leaf knuckle 300.

Similar to the elevation lock 216 and the support bridge 218 of the adjustment pin 214 shown in FIGS. 2A-C, the elevation lock 326 couples with the support bridge 328 and loads the support bridge 328 in tension to distribute load between the upper and lower first leaf knuckles 300 that is otherwise carried by the lower first leaf knuckle 300. The elevation lock 326 is coupled with the upper first leaf knuckle 300 and the distributed load from the support bridge 328 to the lock 326 is transmitted to the upper first leaf knuckle 300 to enhance support of the second leaf knuckle 302 and the panel 303. In this manner, the elevation lock 326 in combination with the remainder of the elevation adjustment pin 324 is configured to distribute the load of the fenestration panel 303, the second leaf 322 and the second knuckle 302 to each of the upper and lower first leaf knuckles 300. The fenestration hinge assembly 306 is thereby able to robustly support the second leaf knuckle 302, the second leaf 322 and the fenestration panel 303.

FIG. 3C is an exploded view of the fenestration hinge assembly 306 previously shown in FIGS. 3A and 3B, an example of an out-swing hinge assembly. As shown, the fenestration hinge assembly is decoupled with the first leaf 320 decoupled from the second leaf 322 and the first and second leaf knuckles 300, 302 are exploded to show one or more orifices, recesses, or the like configured for reception of the pin 324 therein (an elevation adjustment pin in some examples).

The escutcheon 310 is spaced from the first and second leaf knuckles 300, 302 to illustrate the profile of the knuckles. The escutcheon 310 includes the hinge cavity 312 configured for reception of the first and second leaf knuckles 300, 302 that permits movement of the knuckles 300, 302. In the example shown in Figure SC the escutcheon walls that surround the hinge cavity 312 are configured to receive a portion of the first and second leaf knuckles 300, 302, such as an interior hinge portion. In other examples, the escutcheon walls are configured to provide a deeper (or more shallow) hinge cavity 312 configured to receive a corresponding portion of the knuckles 300, 302, up to and including the entirety of the knuckles 300, 302. As described herein, recessing the hinge 308 including the knuckles 300, 302 of the hinge assembly 306 minimizes the profile of the hinge assembly 306 while at the same time moving the rotation axis into proximity with the leaves 320, 322 and the associated fasteners in a manner that enhances support provided by the hinge assembly 306 to support the fenestration panel 303.

As shown in FIG. 3C, the pin 324, as an elevation adjustment pin 324 in this example, includes the pin body 332 with a socket for receipt of a tool such as a hex head, Allen wrench, screwdriver or the like to change the elevation of the adjustment pin 324 relative to one or more of the knuckles, such as the first leaf knuckle 300. In one example, the first (lower) leaf knuckle 300 includes a graduated interface such as a threading, interfitting features or the like to translate rotation of the pin body 332 into elevation movement of the pin body 332 relative to the first leaf knuckle 300. Elevation of the pin body 332 and the associated bearing surface 330 positions the second leaf knuckle 302 and the fenestration panel 303 coupled with the second leaf knuckle 302 by way of the second leaf 322.

In one example, one or more knuckle bushings 340 are interposed between the pin body 332 and the second leaf knuckle 302 to facilitate rotation, wear resistance or the like between the components. In another example, one or more knuckle bushings 340 are interposed between the upper portion of the second leaf knuckle 302 and the lower portion of the upper first leaf knuckle 300.

Referring again to FIG. 3C, like the hinge assembly 106 shown in FIG. 2C, the upper first leaf knuckle 300 optionally includes a support bushing 342 configured for reception within the upper first leaf knuckle 300. The support bushing 342 couples with the elevation lock 326 and distributes an axial load received from the elevation lock 326 and the pin 324 (loaded in tension with coupling of the elevation lock 326 to the support bridge 328) to the upper first leaf knuckle 300.

Referring again to FIG. 3C, in another example, the hinge assembly 306 includes a lateral adjustment feature including, such as the adjustment plate 350 moveably coupled with the second leaf 322. The adjustment plate 350 is moveably coupled with the second leaf 322, for example with a retention flange 352 provided along the second leaf 322 to retain the adjustment plate 350 during installation of the hinge assembly 306 with the fenestration panel 303.

As described herein, in one example, the adjustment plate 350 (like the adjustment plate 240 shown in FIG. 2C) is configured to rotate or move relative to the retention flange 352 and accordingly expand or contract the profile of the second leaf 322 to correspondingly move the fenestration panel 303 coupled with the second leaf 322. The adjustment plate 350 provides a surface configured for engagement with one or more set screws, adjustment jacks or the like that move the adjustment plate 350 and thereby expand or contract the second leaf 322.

Figure 4A:
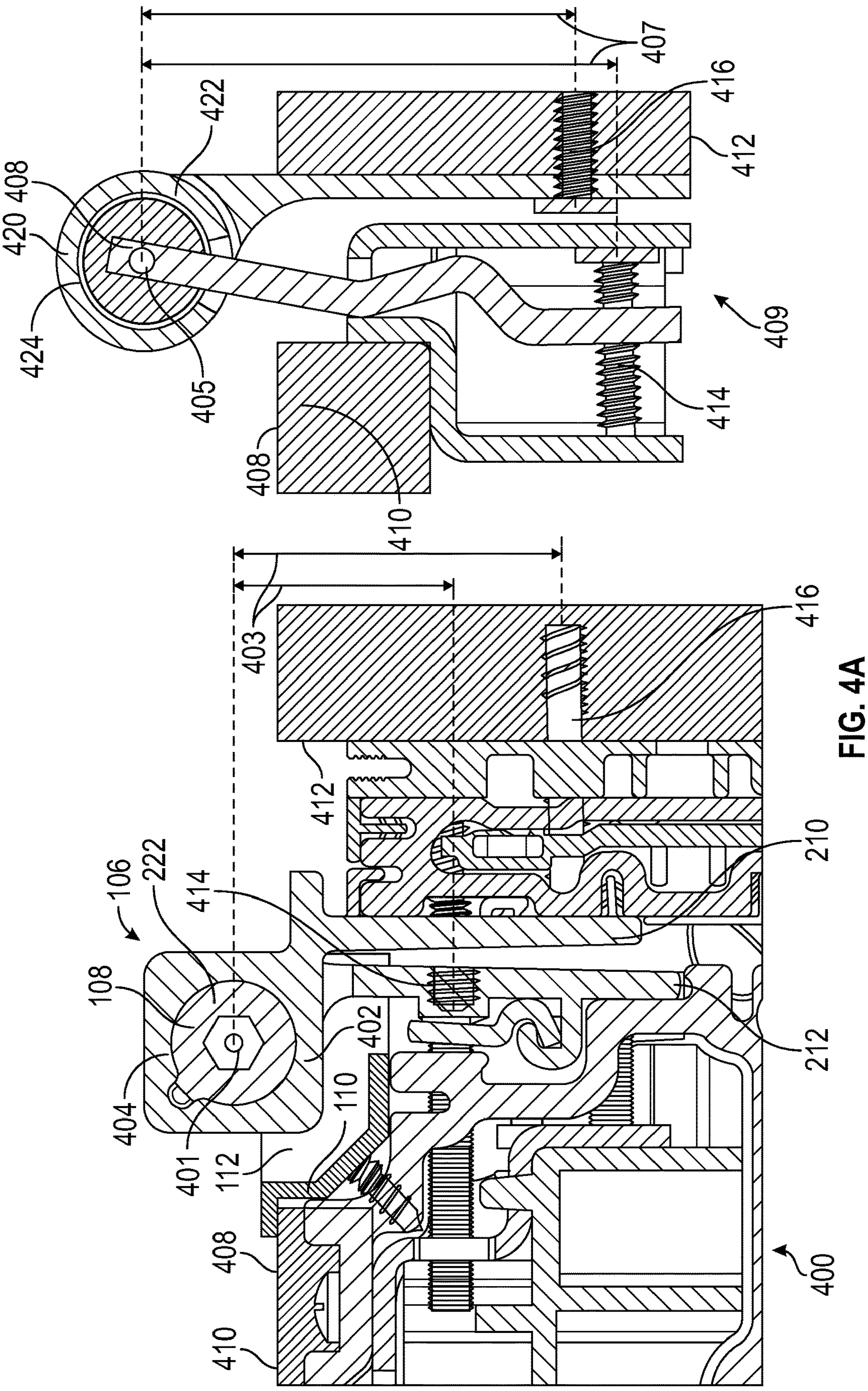
FIG. 4A is a first sectional view comparing fenestration hinge assemblies in closed configurations.

FIG. 4A is a side by side cross-sectional comparison of two fenestration assemblies 400, 409 including different hinge assemblies. The fenestration assembly 400 shown in the left portion of FIG. 4A includes an example of the fenestration hinge assembly 106 previously described and shown herein. As shown, the fenestration hinge assembly 106 includes a hinge 108 that rotatably couples the fenestration panel 410 with the fenestration frame 412. The fenestration panel 410 is configured to rotate relative to the fenestration frame 412 along the rotation axis 401 extending through the hinge 108. In the example shown in FIG. 4A, the fenestration panel 410 includes a fenestration exterior surface 408 such as an outer surface of the fenestration panel 410, a veneer or the like indicating the outermost profile or surface of the fenestration panel 410 relative to the hinge assembly 106. The opposed fenestration assembly 409 includes a hinge assembly 420, such as a butt hinge, interconnecting the fenestration panel 410 and the fenestration frame 412 with the butt hinge knuckles positioned outside of the profile of the panel 410 and the frame 412.

As further shown in FIG. 4A, the fenestration hinge assembly 106 is shown having an exterior hinge component 404 and an interior hinge component 402. In the example shown, the interior hinge component 402 of the hinge assembly 106 is positioned within the profile of the fenestration assembly 400, for instance, within or recessed relative to, the fenestration exterior 408 and a corresponding portion of the fenestration frame 412. In the example shown in FIG. 4A, the recessed escutcheon 110, including the hinge cavity 112, facilitates the positioning of the hinge 106 therein. A portion of the hinge 108 including, for instance, the interior hinge component 402, is positioned within the hinge cavity 112 thereby recessing at least a portion of the hinge 108 relative to the remainder of the fenestration assembly 400. In a similar manner, the interior hinge component 402 is also recessed relative to a corresponding exterior surface of the fenestration frame 412. Accordingly, the fenestration hinge assembly 106 in the left portion of FIG. 4A has a decreased profile relative to the fenestration hinge assembly 420 shown in the right portion of FIG. 4A. The hinge assembly 106 is recessed relative to the fenestration exterior surface 408 in contrast to the exterior and interior hinge components 424, 422 of the fenestration hinge assembly 420 shown in the tight view of FIG. 4A. As shown, the fenestration hinge 420 (in the right portion of FIG. 4A) instead of being positioned within a portion of the fenestration assembly 400 is positioned outside of the fenestration exterior surface 408 and the corresponding exterior surface of the fenestration frame 412. As further shown, the rotation axis 405 is positioned away from the remainder of the fenestration assembly 410.

As further shown by the comparison in FIG. 4A, hinge assembly moment arms 403 extending between fasteners 416, 414 of the fenestration assembly 400 and the rotation axis 401 of the hinge assembly 106 have a decreased dimension or length relative to the hinge assembly moment arms 407 of the corresponding fenestration hinge assembly 420 (e.g., a butt hinge). As will be described and shown in FIG. 4B, the hinge assembly moment arms 403 in contrast to the hinge assembly moment arms 407 of the fenestration hinge assembly 420 minimize loading of the hinge assembly 106 in comparison to the fenestration hinge assembly 420 and correspondingly decrease loading of the frame 412, for instance at the fasteners 416.

As shown in FIG. 4A and as previously described herein, a portion of the fenestration hinge assembly 106, such as the exterior hinge component 404, extends outside of the fenestration exterior surface 408 of the fenestration panel 410 and the corresponding portion of the fenestration frame 412. In one example, the exposed portion of the hinge assembly 106 includes the pin body 222 used for adjustment of an example elevation adjustment pin 214 as shown in FIG. 2B. By maintaining a portion of the hinge 108 outside of the fenestration exterior surface 408 and the corresponding portion of the fenestration frame 412 adjustment of the fenestration hinge assembly 106 is readily accomplished while the hinge assembly 106 remains coupled with each of the fenestration panel 410 and the fenestration frame 412 (e.g., with the first and second leaves 210, 212). As shown in FIG. 4A, the tool access of the pin body 222 remains exposed with the hinge assembly 106 in the installed configuration to facilitate elevational adjustment of the fenestration panel 410 without requiring decoupling of one or more of the hinge assembly 106, fenestration panel 410 or the like from the remainder of the fenestration assembly 400. The fenestration hinge assembly 106 thereby provides access to an adjustment feature while also recessing the profile of the hinge 108 (e.g., the knuckles 200, 202) relative to the fenestration assembly 400.

In another example, for instance, with a pin of the hinge assembly 106 including a concealed adjustment component or not including an adjustment component, the fenestration hinge assembly 106 including the hinge 108 is recessed to an additional degree relative to that shown in FIG. 4A. For instance, all or a greater portion of the hinge 108 is recessed relative to the fenestration exterior surface 408 and the corresponding portion of the fenestration frame 412. In one example, the hinge 108 is recessed fully relative to the fenestration exterior surface 408, for instance, is flush with or recessed relative to the fenestration exterior surface 408.

With the recessing of the fenestration hinge assembly 106 as shown in FIG. 4A, the profile of the fenestration hinge assembly 106 is decreased relative to the fenestration hinge assembly 420 shown in the right view of FIG. 4A (e.g., a butt hinge). For instance, one or more portions of the hinge assembly 106 including, for instance, the interior hinge component 402 is recessed from the profile of the fenestration assembly 400. In contrast, the fenestration hinge assembly 420, as shown in the right view of FIG. 4A, is provided in a projecting manner or standing proud relative to the fenestration exterior surface 408 and the corresponding portion of the fenestration frame 412 of the fenestration assembly 409.

Figure 4B:
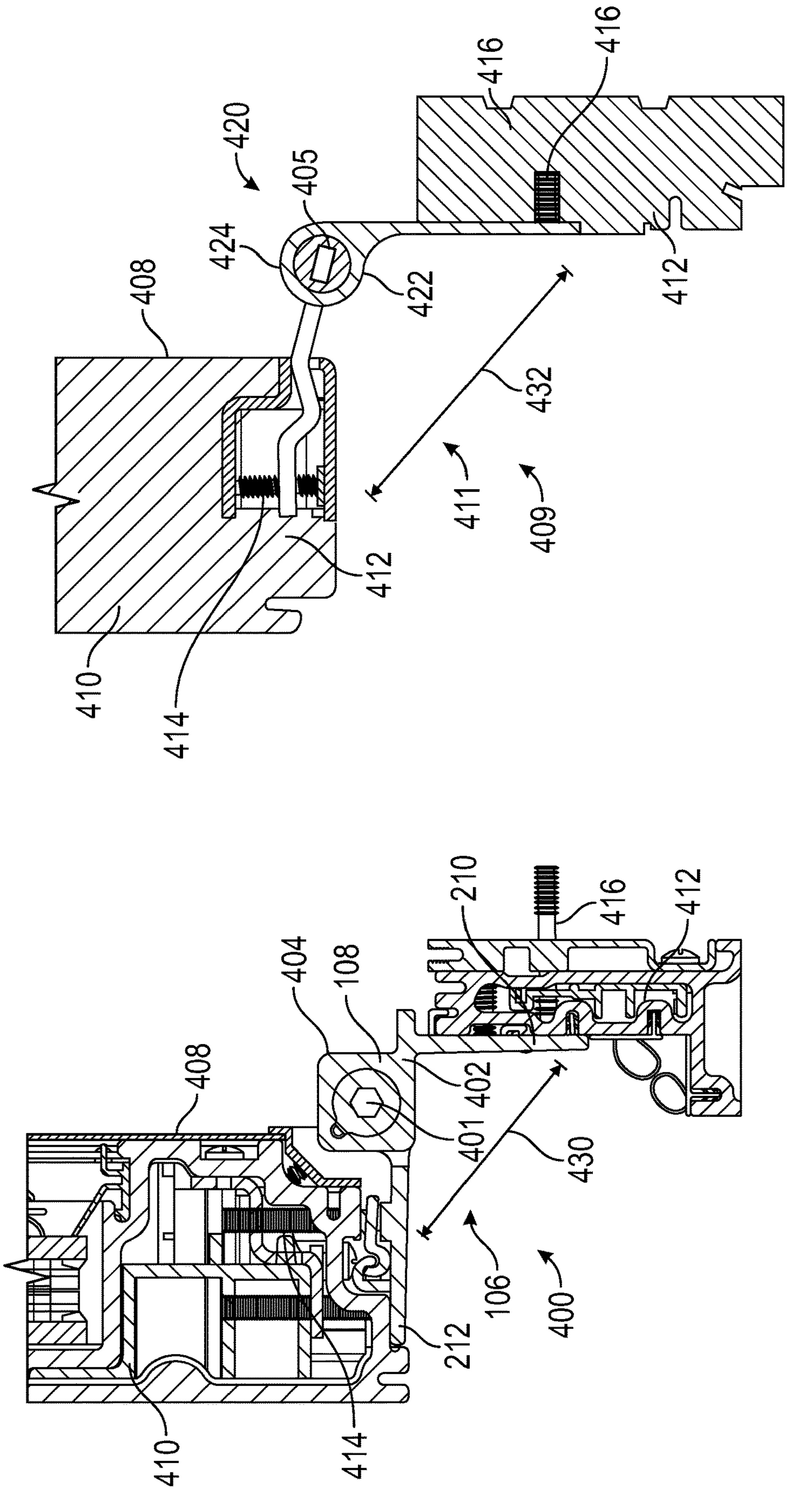
FIG. 4B is a second sectional view comparing the fenestration hinge assemblies of FIG. 4A in open configurations.

FIG. 4B shows two opposed views of the fenestration assemblies 400, 409 previously shown and described in FIG. 4A with each of the assembly 400, 409 in an open configuration. Referring first to the left view in FIG. 4B, the hinge assembly 106 including, for instance, the hinge 108 previously shown and described herein is in a rotated position with the second leaf 212 associated with the fenestration panel 410 rotated approximately 90 degrees relative. The first leaf 210 is shown coupled with the fenestration frame 412. As further shown in FIG. 4B, the second fenestration hinge assembly 420, such as a butt hinge, is also shown in an open configuration, for instance, with the fenestration panel 410 rotated to an open position relative to the fenestration panel 412.

As previously shown and described in FIG. 4A, the hinge assembly moment arms 403 and hinge assembly moment arms 407 of their respective fenestration hinge assemblies 106, 420 are shown in FIG. 4A. In this example, because of the greater hinge assembly moment arms 407 of the fenestration hinge assembly 420, the resulting open moment arm 432 extending between fasteners 414, 416 coupled with the fenestration panel 410 and the fenestration frame 412 is a larger moment arm 432 relative to the open moment arm 430 shown with the hinge assembly 106 previously described and shown herein. For instance, in one example, the hinge assembly moment arms 403 (see FIG. 4A) extending between the rotation axis 401 of the hinge assembly 106 and the corresponding fasteners 414, 416 of the hinge assembly 106 are shorter relative to the hinge assembly moment arms 407 previously shown in FIG. 4A. Accordingly, the resulting open moment arm 430 of the hinge assembly 106 extending between the fasteners 414, 416 is shorter relative to the open moment arm 432 of the fenestration hinge assembly 420 (e.g., a butt hinge). Accordingly, the load of the fenestration panel 410 applied to the fenestration frame 412 in the left version of the fenestration assembly 400 with the hinge assembly 106 is less in comparison to the load otherwise applied by the fenestration panel 410 when including the fenestration hinge assembly 420 shown in the right view of FIG. 4B. Accordingly, the load experienced by the fenestration frame 412 and the hinge 106 (including the fasteners

416) is, in one example, decreased with the fenestration hinge assembly 106 shown in FIG. 4B.

Optionally, the load of the fenestration panel 410, for instance weight, is the same between each of the fenestration assemblies 400, 409 however the moment or torque applied by the fenestration panel 410 through the fenestration hinge assembly 106 in the left view of the fenestration assembly 400 is less relative to the right view of the fenestration assembly 409 with the hinge assembly 420. Because the open moment arm 430 is decreased with the fenestration hinge assembly 106 (e.g., because of the recessed and compact nature of the hinge assembly 106) the torque applied across the hinge assembly 106 and applied through the fastener 416 is thereby less.

As previously described herein, the minimizing of load transmitted through the hinge assembly 106 and applied to the fenestration frame 412, for instance, through the fasteners 416, facilitates the use of a smaller number of hinge assemblies 106 and smaller sized hinge assemblies relative to the hinge assemblies 420 shown, for instance, in the rightmost view of FIG. 4B. The recessed and lesser number, and in some cases smaller hinge assemblies 106 minimize interruption of the clean or sleek aesthetic appearance of the fenestration assembly 400 while at the same robustly supporting large fenestration panels 410 that may otherwise warrant the use of additional fenestration hinge assemblies 420.

Figure 5:
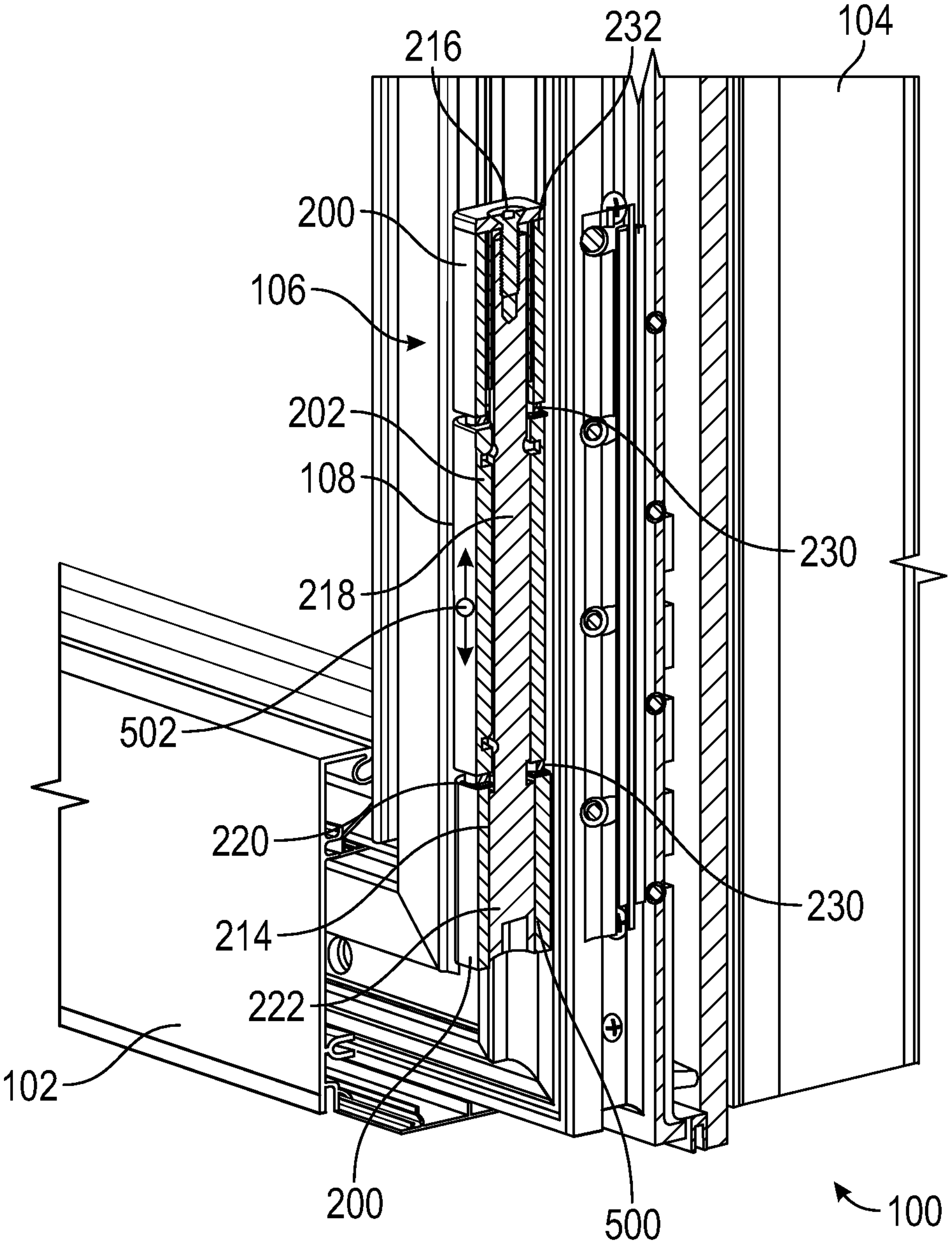
FIG. 5 is a sectional view of the fenestration hinge assembly shown in FIG. 2A including an elevation adjustment pin.

FIG. 5 is a sectional view of one example of the fenestration assembly 100 including the fenestration hinge assembly 106. As previously described herein in one example, the fenestration hinge assembly 106 includes one or more adjustment features configured to adjust the hinge assembly 106 and one or more features of the fenestration assembly 100, for instance, while the fenestration panel 102 remains coupled with the fenestration frame 104. As shown in FIG. 5, the hinge assembly 106, in this example, includes an adjustable hinge 108 including, for instance, first and second leaf knuckles 200, 202. In this example, the first leaf knuckle 200 includes upper and lower leaf knuckles 200 coupled with one of the leaves of the fenestration hinge assembly 106 (e.g., the first leaf 210 shown in FIGS. 2A-C). Conversely, a second leaf knuckle 202 is coupled with the fenestration panel 102, for instance, with an opposed leaf (e.g., second leaf 212) of the hinge assembly 106. A pin, such as the elevation adjustment pin 214, extends through each of the first and second knuckles 200, 202 to provide a rotatable coupling between the first and second knuckles 200, 202 for rotation of the fenestration panel 102 relative to the fenestration frame 104. As previously shown in FIG. 4A, the elevation adjustment pin 214, for instance the pin body 222, remains at least partially exposed relative to the fenestration panel 102 and the fenestration frame 104 for access to the pin body 222 to permit elevational adjustment of the fenestration panel 102 relative to the frame 104 without decoupling of the panel 102 relative to the fenestration frame 104.

As further shown in FIG. 5, the elevation adjustment pin 214 extends through each of the knuckles 200, 202. As shown the elevation adjustment pin extends through the second knuckle 202 into and through the upper first knuckle 200. In one example, a graduated interface 500 such as threading, stepped ridges or the like are interposed between the pin body 222 and the first knuckle 200 (e.g., the lower first knuckle 200 in the example shown in FIG. 5). Rotation of the pin body 222 with a driver, Allen wrench, hex head or the like correspondingly rotates the pin body 222 relative to the graduated interface 500 and facilitates elevational movement of the pin body 222 and the elevation adjustment pin 214 relative to the first knuckle 200 including the upper and lower first knuckles 200. The elevational movement of the pin body 222 correspondingly moves a bearing surface 220 coupled with the second leaf knuckle 202 and thereby changes the vertical position of the second leaf knuckle 202 and the fenestration panel 102 coupled with the knuckle relative to the fenestration frame 104. For instance, with rotational movement of the pin body 222 in a clockwise motion when viewed from below, the pin body 222 is advanced upward relative to the lower first leaf knuckle 200 and the bearing surface 220 is correspondingly elevated relative to the knuckle 200. The bearing surface 220 engages, whether directly or indirectly, with the second leaf knuckle 202 and accordingly biases the second leaf knuckle 202 upwardly along with the fenestration panel 102 coupled with the knuckle 202 by way of the intervening leaf. The elevation movement of the second leaf knuckle 202 is shown by the elevation adjustment 502 in FIG. 5. Conversely, rotation of the pin body 222 in a counter fashion, (e.g., counterclockwise) causes the pin body 222 to descend relative to the first leaf knuckle 200 and accordingly the bearing surface 220 also descends. By lowering the bearing surface 220 the coupled (whether directly or indirectly) second leaf knuckle 202 correspondingly lowers thereby lowering the fenestration panel 102. As shown in FIG. 1, an elevation adjustment 504 of the fenestration panel 102 is provided by the fenestration hinge assembly 106 and the elevation adjustment 502 shown in FIG. 5. In this manner, the fenestration panel 102 is elevated up or down relative to the remainder of the fenestration assembly including, for instance, the opposed panel 102, fenestration frame 104 or the like.

As previously described in one example, the elevation adjustment pin 214 is retained in place to maintain the elevation adjustment 502 and optionally distribute the load of the fenestration panel 102, for instance, from the first (lower) leaf knuckle 200 between the upper and lower first leaf knuckles 200. For instance, in one example, the elevation lock 216 is provided with the upper first leaf knuckle 200 as shown in the sectional view of FIG. 5. The elevation lock 216, in one example, includes a socket configured for receipt of a tool such as a hex head, Allen wrench, screwdriver or the like. The elevation lock 216 couples with the elevation adjustment pin 214, for instance, with an intervening graduated interface such as threading or the like and retains the elevation adjustment pin 214 in an adjusted position. For instance, the elevation lock 216 couples with the adjusted pin body 222 (e.g., providing the elevation adjustment 502) to preserve the elevation adjustment. Coupling the elevation lock 216 with the elevation adjustment pin 214 prevents, minimizes or constrains movement of the pin body 222 relative to the lower first leaf knuckle 200 that would otherwise move the pin body 222 and change the elevation adjustment 502 from the specified adjustment.

In another example, the elevation lock 216 facilitates the distribution of load from the lower first leaf knuckle 200 between the lower and upper first leaf knuckles 200. In one example, the elevation lock 216 when coupled with the elevation adjustment pin 214 loads the support bridge 218 of the elevation adjustment pin 214 in tension. The tension applied through the support bridge 218 of the elevation adjustment pin 214 transmits some of the load, for instance, the weight or torque otherwise applied to the lower first leaf knuckle 200 and instead distributes the load through the support bridge 218 loaded in tension to the elevation lock 216 and the surrounding upper first leaf knuckle 200. Optionally, as the elevation lock 216 is tightened the distribution of load correspondingly shifts from the lower first leaf knuckle 200 to the upper first leaf knuckle 202.

In one example, a support bushing 232 is interposed between the elevation lock 216 and the upper first leaf knuckle 200. The support bushing 232 distributes the axial load received from the elevation lock 216 and the elevation adjustment pin 214 to a corresponding larger surface of the upper first leaf knuckle 200 and the associated first leaf 210. The load from the second leaf 212 including the weight of the fenestration panel 202 otherwise carried by the second leaf knuckle 202 and the lower first leaf knuckle 200 is thereby distributed and carried by each of the lower and upper first leaf knuckles 200. By distributing the load of the fenestration panel 102 through each of the upper and lower first leaf knuckles 200 preferential loading of one of the knuckles 200 is minimized and a decrease in the overall profile of the hinge assembly 106 is permitted while still robustly supporting the fenestration panel 102. In one example, the distributed support facilitates using fewer hinge assemblies, even with larger doors, windows or the like, otherwise primarily supported by the lower first leaf knuckle 200. Additionally, the elevation adjustment pin 214 facilitates the adjustment of the fenestration panel 102 without requiring decoupling of one or more of the hinges 106 and allows adjustment of the fenestration panel 102 in situ, for instance, without interruption of use or decoupling of components of the fenestration assembly 100.

In still other examples, the fenestration hinge assembly 106 includes one or more knuckle bushings 230, 340 (as shown in FIGS. 2C, 3C) interposed between load bearing surfaces of the first and second leaf knuckles 200, 202. The knuckle bushings 230 (and 340) minimize wear between the knuckles while also facilitating support of the knuckles 200, 202 and their associated loading (e.g., with the weight and moment of the fenestration panel 102).

Figure 6:
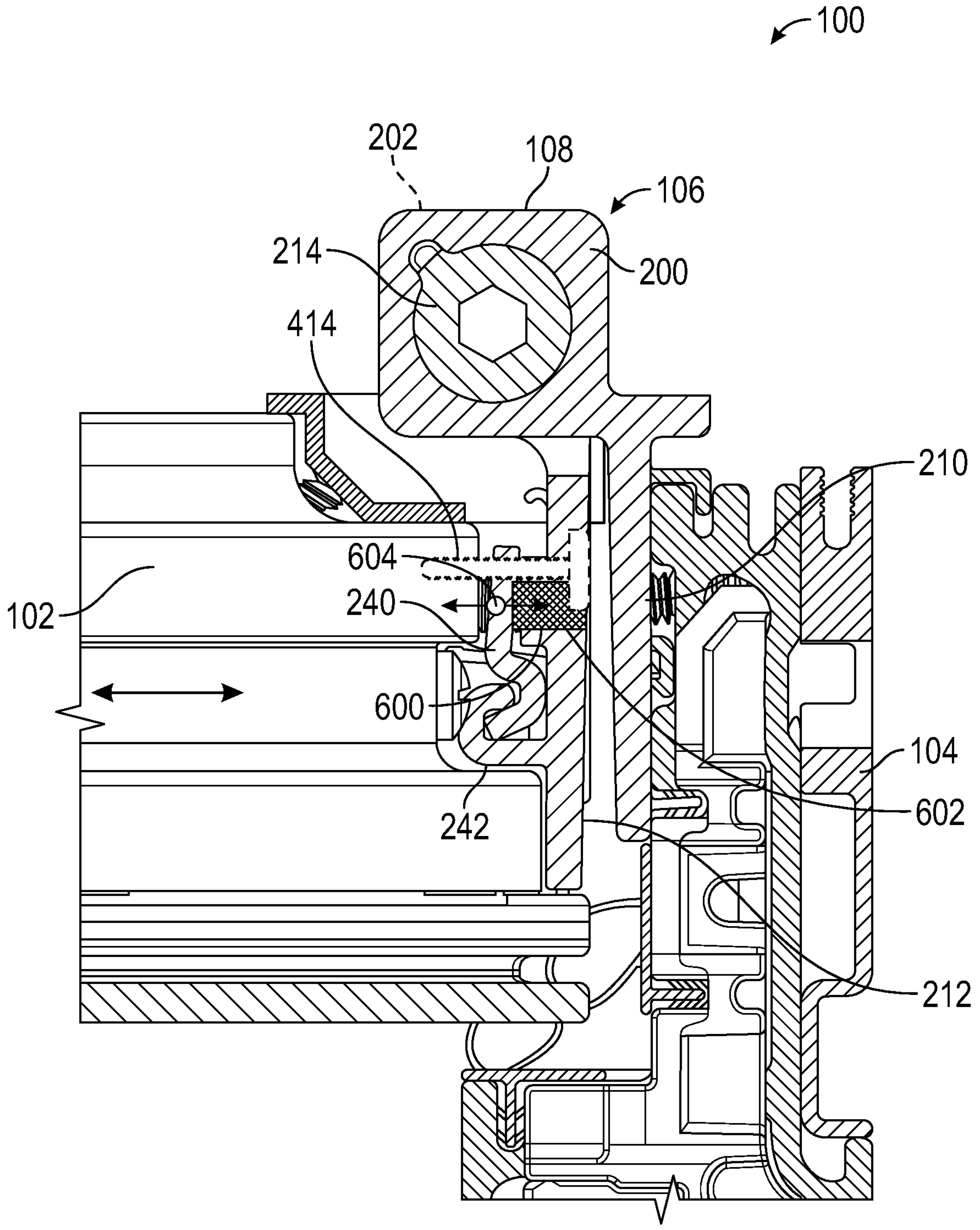
FIG. 6 is another sectional view of the fenestration hinge assembly shown in FIG. 2A including a lateral adjustment jack.

FIG. 6 is a cross-sectional view of the fenestration assembly 100 previously shown and described herein. In this example, the cross-sectional view is taken horizontally relative to the fenestration hinge assembly 106, the fenestration panel 102 and the fenestration frame 104 to illustrate a lateral adjustment feature. As shown, the fenestration hinge assembly 106 rotatably couples the fenestration panel 102 with the fenestration frame 104.

In the view shown in FIG. 6, one example of a lateral adjustment function of the hinge assembly 106 is shown. The lateral adjustment mechanism is provided by an adjustment plate 240 moveably coupled with the remainder of the second leaf 212. As will be described herein, movement of the adjustment plate 240 correspondingly expands or contracts the second leaf 212 thereby increasing or decreasing the profile of the second leaf 212 and correspondingly moving the fenestration panel 102 in a lateral manner, for instance, in a manner corresponding with the hinge assembly lateral adjustment 604 shown with the arrows in FIG. 6. The lateral hinge adjustment 604 shown in FIG. 6 initiates corresponding lateral movement of the panel 102, for instance, represented with the panel lateral adjustment 606 shown in FIG. 1. In one example, lateral movement of the panel 102 relative to the fenestration frame 104, an opposed fenestration panel 102 or the like facilitates the maintenance of a specified reveal, gap, tolerance with locking hardware or the like between the fenestration panel 102 and the opposed fenestration panel 102 or fenestration frame 104. In another example, the lateral adjustment of one of the fenestration hinge assemblies 106 relative to another of the fenestration hinge assemblies 106 permits leveling of the fenestration panel 102, for instance, through selective adjustment at one or both of the fenestration hinge assemblies 106 shown in FIG. 1.

Referring again to FIG. 6, as shown the adjustment plate 240 is, in one example, moveably coupled with the second leaf 212. The adjustment plate 240 is movably coupled with the second leaf 212, for instance, with the retention flange 242. The retention flange 242, in one example, provides a hooked or bayoneted type feature that couples with an end of the adjustment plate 240 having a complementary shaped feature. As shown in the cross-sectional view of FIG. 6, the adjustment plate 240 is movably held or retained along the remainder of the second leaf 212, for instance, during installation of the fenestration hinge assembly 106 to the fenestration panel 102 and the fenestration frame 104.

As further shown in FIG. 6, the adjustment mechanism for the fenestration hinge assembly 106, in this example, includes one or more lateral adjustment jacks 602 coupled with the second leaf 212 and extending toward the adjustment plate 240. In one example, the second leaf 212 includes a graduated interface (e.g., threading) configured to translate rotation of the lateral adjustment jack 602 relative to the second leaf 212 to lateral movement adjustment jack 602.

In operation, the lateral adjustment jack 602 is rotated to and thereby translated relative to the second leaf 212. Movement of the lateral adjustment jack 602 moves the jack toward or away from the adjustment plate 240. Adjustment of the jack 602 toward the adjustment plate 240 pushes the plate 240 away from the second leaf 212 and virtually expands the second leaf 212 (e.g., the adjustment plate behaves as a leftmost surface of the leaf 212 in the view shown in FIG. 6). Accordingly, the fenestration panel 102 is biased in a corresponding direction (to the left) with movement of the adjustment jack 602. Movement of the adjustment plate 240 to the left expands the second leaf 212 and thereby moves or drives the fenestration panel 102 in a corresponding manner, in this example, to the left. Movement of the fenestration panel 102, in one example, moves the opposed edge of the panel 102 remote from the hinge assembly 106 into a more proximate position relative to an opposed surface, for instance, of another door panel, opposed jamb of a frame or the like. Conversely, movement of the adjustment jack 602 away from the plate 240 relaxes the plate 240 and virtually shrinks the second leaf 212 to facilitate the adjustment of the panel in an opposed direction (right in this view).

In another example, after lateral adjustment with the adjustment plate 640 to virtually compress or expand the second leaf 212, one or more features of the fenestration hinge assembly 106 are operated to lock the adjustment plate 240 and thereby retain the adjustments provided by lateral adjustment of the fenestration hinge assembly 106. For instance, the fastener 414 previously described and shown in FIGS. 4A, 4B is, in one example, tightened to draw the fenestration panel 102 into close engagement with the second leaf 212 and thereby engage the adjustment plate 240 on an opposed side relative to the adjustment jack 602 to fix the adjustment plate 240 in position.

In another example, where lateral adjustment of the hinge assembly 106 and the fenestration panel 102 are desired (e.g., after installation), the fenestration panel 102 is moved to an open position and the fastener 414 is loosened to permit relative movement of the adjustment plate 240 relative to the fenestration panel 102. The adjustment plate 240 is moved, for instance, with the adjustment jack 602 rotated relative to the second leaf 212 to move the adjustment plate 240 into an expanded or contracted configuration relative to the second leaf 212. When a specified position of the adjustment plate 240 is achieved, the fenestration panel 102 is again tightened to the fenestration hinge assembly 106, for instance, with tightening of the fastener 414. Accordingly with the lateral adjustment features described herein, the fenestration hinge assembly 106 is configured to be adjusted while the fenestration hinge assembly 106 remains installed and coupled with each of the fenestration panel 102 and the fenestration frame 104. Accordingly, decoupling of one or more portions of the fenestration hinge assembly 106 from the panel 102 or the fenestration frame 104 is thereby avoided.

Figure 7:
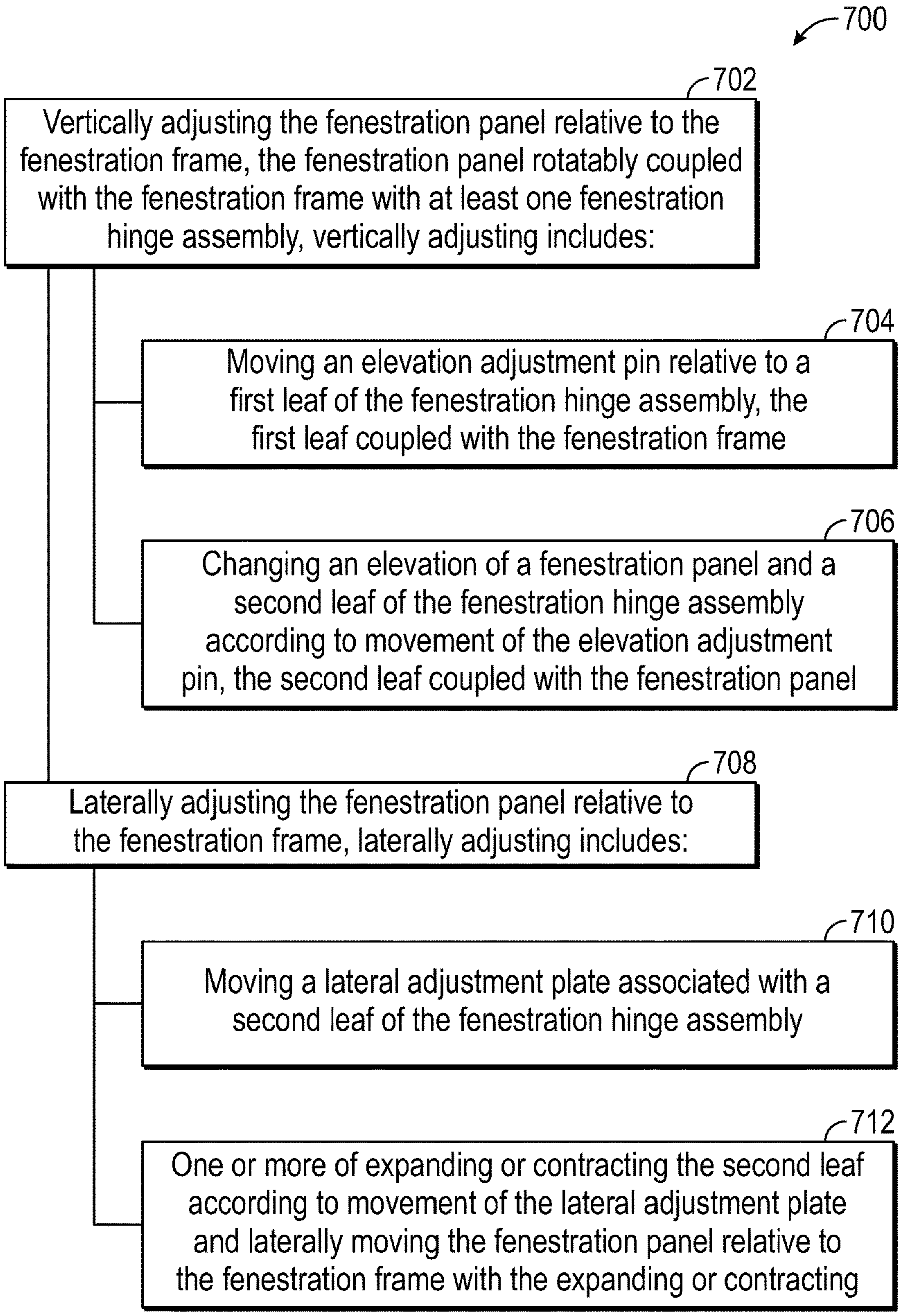
FIG. 7 is a block diagram showing one example of a method for adjusting a fenestration assembly.

FIG. 7 shows one example of a method 700 for adjusting a fenestration assembly, such as the assembly 100 shown in FIG. 1. In describing the method 700, reference is made to one or more components, features, functions, steps or the like previously described herein. Where convenient, reference is made to the components, features, functions, steps or the like with reference numerals. Reference numerals provided are exemplary and are not exclusive. For instance, components, features, functions, steps or the like described in the method 700 include, but are not limited to, corresponding numbered elements provided herein, other corresponding features described herein (both numbered and unnumbered) as well as their equivalents.

At 702 a fenestration panel 102 is vertically adjusted relative to a fenestration frame 104. The fenestration panel is rotatably coupled with the fenestration frame with at least one fenestration hinge assembly 106. Vertical adjusting includes at 704 moving an elevation adjustment pin 214 relative to a first leaf 210 of the fenestration hinge assembly 106. The first leaf 210 is coupled with the fenestration frame 104 and one or more first leaf knuckles 200. At 706, moving the elevation adjustment pin 214 changes an elevation of the fenestration panel 102 and a second leaf 212 of the fenestration hinge assembly 106 according to movement of the pin 214.

At 708 the fenestration panel 102 is laterally adjusted relative to the fenestration frame 104. At 710 lateral adjustment includes moving an adjustment plate 240 associated with the second leaf 212 of the fenestration hinge assembly 106. At 712 movement of the adjustment plate 240 expands or contracts the second leaf 212 according to movement of the plate 240 and causes corresponding lateral movement of the fenestration panel 102 relative to the fenestration frame 104. In an example, one or both of vertical or lateral adjustment of the fenestration panel 102 includes vertically or laterally adjusting the fenestration panel 102 while the fenestration panel 102 and the fenestration frame 104 are rotatably coupled with the at least one fenestration hinge assembly 106. For example, decoupling of the hinge assembly 106 from one or more components of the fenestration assembly 100 (e.g., the panel or frame) is not necessary for adjustment.

Several options for the method 700 follow. In one example, moving the elevation adjustment pin 214 includes rotating the elevation adjustment pin 214 relative to the first leaf 210 and changing the elevation of a bearing surface 220 of the elevation adjustment pin according to the rotation. The bearing surface 220 is coupled with the second leaf 212, for instance with the second leaf knuckle 202. In another example, changing the elevation of the fenestration panel 102 and the second leaf 212 includes changing the elevation of the fenestration panel 102 and the second leaf 212 according to the change of elevation of the bearing surface 220.

In another example, the first leaf 210 includes an upper first leaf knuckle 200 and a lower first leaf knuckle 200. The method 700 optionally includes locking the elevation adjustment pin 214 with an elevation lock 216 coupled with one of the upper or lower first leaf knuckles 200. Optionally, the elevation adjustment pin 214 is coupled with the lower first leaf knuckle 200, and locking the elevation adjustment pin 214 (e.g., with the elevation lock 216) includes distributing a load of the second leaf and the fenestration panel (e.g., weight, torque, a combination of both or the like) between the upper and lower first leaf knuckles 200.

In an additional example, moving the lateral adjustment plate 240 includes moving a lateral adjustment jack 600 coupled between the second leaf 212 and the lateral adjustment plate 240 associated with the second leaf 212. Expanding or contracting the second leaf 212 includes moving the lateral adjustment plate 240 according to movement of the lateral adjustment jack 242.

In an example, the method 700 includes positioning a portion of the fenestration hinge assembly 106, including knuckles 200, 202 of one or more of the first or second leaves 210, 212, within one or more profiles of the fenestration panel 102 or the fenestration frame 104 including an exterior surface, perimeter or the like of one or both of the panel or the frame 102, 104. In this context, the exterior surface, portion or the like of a component includes an outer feature of one or more components and does not necessarily refer to an exterior environment (e.g., outdoor relative to indoor). Optionally, positioning the portion (e.g., interior portion 402 in FIG. 4A) of the fenestration assembly 106 within the one or more profiles includes positioning portions of the knuckles 200, 202 within the one or more profiles. In another example, positioning the portion of the fenestration assembly 106 within the one or more profiles includes positioning the knuckles 200, 202 within a hinge cavity 112 of a recessed escutcheon 110.

Various Notes

Aspect 1 can include subject matter such as a fenestration hinge assembly comprising: a first leaf having one or more first leaf knuckles; a second leaf rotatably coupled with the first leaf, the second leaf having one or more second leaf knuckles; a hinge including the first and second leaf knuckles rotatably coupled with each other; and a recessed escutcheon configured for recessed installation within at least one of a fenestration panel or a fenestration frame of a fenestration assembly, the recessed escutcheon includes: a hinge cavity; and wherein the first and second leaf knuckles are at least partially received within the hinge cavity.

Aspect 2 can include, or can optionally be combined with the subject matter of Aspect 1, to optionally include wherein the first and second leaf knuckles at least partially received in within the hinge cavity include an interior hinge component of the hinge, and the interior hinge component is received within the hinge cavity.

Aspect 3 can include, or can optionally be combined with the subject matter of one or any combination of Aspects 1 or 2 to optionally include wherein the hinge is spaced from a cavity wall of the recessed escutcheon extending around the hinge cavity.

Aspect 4 can include, or can optionally be combined with the subject matter of one or any combination of Aspects 1-3 to optionally include the fenestration assembly including the fenestration panel rotatably coupled with the fenestration frame with the hinge.

Aspect 5 can include, or can optionally be combined with the subject matter of one or any combination of Aspects 1-4 to optionally include wherein the first and second leaf knuckles at least partially received within the hinge cavity are recessed from a fenestration exterior surface of one or more of the fenestration frame or the fenestration panel.

Aspect 6 can include, or can optionally be combined with the subject matter of Aspects 1-5 to optionally include a lateral adjustment plate movably coupled with a remainder of the second leaf, and the lateral adjustment plate is configured to position at least a portion of the second leaf laterally relative to one of the fenestration frame or the fenestration panel of the fenestration assembly; and a lateral adjustment jack movably coupled with the second leaf, and the lateral adjustment jack is configured to move the lateral adjustment plate relative to the remainder of the second leaf.

Aspect 7 can include, or can optionally be combined with the subject matter of Aspects 1-6 to optionally include wherein the lateral adjustment jack is coupled between the lateral adjustment plate and the remainder of the second leaf; and wherein movement of the lateral adjustment jack moves the adjustment plate laterally relative to the remainder of the second leaf and relative to one of the fenestration frame or the fenestration panel of the fenestration assembly.

Aspect 8 can include, or can optionally be combined with the subject matter of Aspects 1-7 to optionally include wherein movement of the lateral adjustment jack includes one or more of expansion or contraction of the second leaf with relative movement of the adjustment plate relative to the remainder of the second leaf.

Aspect 9 can include, or can optionally be combined with the subject matter of Aspects 1-8 to optionally include wherein the hinge includes an elevation adjustment pin interconnecting the first and second leaf knuckles, wherein the elevation adjustment pin is configured to position the second leaf vertically relative to the first leaf.

Aspect 10 can include, or can optionally be combined with the subject matter of Aspects 1-9 to optionally include wherein the elevation adjustment pin includes: a bearing surface coupled with the second leaf knuckle; and wherein elevation movement of the bearing surface is configured to change the elevation of the second leaf knuckle and second leaf relative to the first leaf knuckle and the first leaf.

Aspect 11 can include, or can optionally be combined with the subject matter of Aspects 1-10 to optionally include wherein the one or more first leaf knuckles include upper and lower first leaf knuckles, and the elevation adjustment pin includes a support bridge extending between the upper and lower first leaf knuckles.

Aspect 12 can include, or can optionally be combined with the subject matter of Aspects 1-11 to optionally include wherein the elevation adjustment pin includes a locked configuration, and in the locked configuration the support bridge distributes a load from the second leaf knuckle to each of the upper and lower first leaf knuckles of the first leaf.

Aspect 13 can include, or can optionally be combined with the subject matter of Aspects 1-12 to optionally include an elevation lock coupled with the upper first leaf knuckle, and in the locked configuration the elevation lock couples with the support bridge, interconnects the elevation adjustment pin with the upper first leaf knuckle, and arrests positioning of the second leaf vertically relative to the first leaf.

Aspect 14 can include, or can optionally be combined with the subject matter of Aspects 1-13 to optionally include a fenestration assembly comprising: a fenestration frame; a fenestration panel movably coupled with the fenestration frame; and at least one fenestration hinge assembly coupled between the fenestration frame and the fenestration panel, wherein the at least one fenestration hinge assembly includes: a first leaf coupled with the fenestration frame, the first leaf having one or more first leaf knuckles; a second leaf coupled with the fenestration panel and rotatably coupled with the first leaf, the second leaf having one or more second leaf knuckles; a lateral adjustment plate associated with one of the first or second leaves; an elevation adjustment pin interconnecting the first and second leaf knuckles; and wherein the at least one fenestration hinge assembly includes each of lateral and vertical adjustment configurations: in the lateral adjustment configuration the lateral adjustment plate is adjusted to expand or contract the associated first or second leaf and laterally move the fenestration panel relative to the fenestration frame; and in the elevation adjustment configuration the elevation adjustment pin is adjusted to position the second leaf and the fenestration panel vertically relative to the first leaf and the fenestration frame.

Aspect 15 can include, or can optionally be combined with the subject matter of Aspects 1-14 to optionally include wherein the first leaf is coupled with the fenestration frame and the second leaf is coupled with the fenestration panel in each of the lateral and elevation adjustment configurations.

Aspect 16 can include, or can optionally be combined with the subject matter of Aspects 1-15 to optionally include a recessed escutcheon, and the first and second leaf knuckles are at least partially received within a hinge cavity of the recessed escutcheon.

Aspect 17 can include, or can optionally be combined with the subject matter of Aspects 1-16 to optionally include wherein the first and second leaf knuckles are spaced from a cavity wall of the recessed escutcheon extending around the hinge cavity.

Aspect 18 can include, or can optionally be combined with the subject matter of Aspects 1-17 to optionally include a lateral adjustment jack movably coupled with the lateral adjustment plate and the associated first or second leaf, and in the lateral adjustment configuration the lateral adjustment jack is configured to move the lateral adjustment plate to expand or contract the associated first or second leaf.

Aspect 19 can include, or can optionally be combined with the subject matter of Aspects 1-18 to optionally include wherein associated first or second leaf includes the lateral adjustment plate.

Aspect 20 can include, or can optionally be combined with the subject matter of Aspects 1-19 to optionally include wherein the elevation adjustment pin includes: a bearing surface coupled with the second leaf knuckle; and wherein elevation movement of the bearing surface is configured to change the elevation of the second leaf knuckle and fenestration panel.

Aspect 21 can include, or can optionally be combined with the subject matter of Aspects 1-20 to optionally include wherein the elevation adjustment pin is coupled with the first leaf knuckle with a graduated interface, and in the elevation adjustment configuration rotation of the elevation adjustment pin changes the elevation of the elevation adjustment pin and the bearing surface and changes the elevation of the second leaf knuckle and the fenestration panel.

Aspect 22 can include, or can optionally be combined with the subject matter of Aspects 1-21 to optionally include wherein the one or more first leaf knuckles include upper and lower first leaf knuckles, and the elevation adjustment pin includes a support bridge extending between the upper and lower first leaf knuckles.

Aspect 23 can include, or can optionally be combined with the subject matter of Aspects 1-22 to optionally include wherein the elevation adjustment pin includes a locked configuration, and in the locked configuration the support bridge distributes a load from the second leaf knuckle to each of the upper and lower first leaf knuckles of the first leaf.

Aspect 24 can include, or can optionally be combined with the subject matter of Aspects 1-23 to optionally include an elevation lock coupled with the upper first leaf knuckle, and in the locked configuration the elevation lock: couples with the support bridge; interconnects the elevation adjustment pin with the upper first leaf knuckle; and arrests movement of the elevation adjustment pin.

Aspect 25 can include, or can optionally be combined with the subject matter of Aspects 1-24 to optionally include a method of adjusting a fenestration assembly comprising: vertically adjusting the fenestration panel relative to the fenestration frame, the fenestration panel rotatably coupled with to the fenestration frame with at least one fenestration hinge assembly, vertically adjusting includes: moving an elevation adjustment pin relative to a first leaf of the fenestration hinge assembly, the first leaf coupled with the fenestration frame; and changing an elevation of a fenestration panel and a second leaf of the fenestration hinge assembly according to movement of the elevation adjustment pin, the second leaf coupled with the fenestration panel; and laterally adjusting the fenestration panel relative to the fenestration frame, laterally adjusting includes: moving a lateral adjustment plate associated with a second leaf of the fenestration hinge assembly, the second leaf coupled with the fenestration panel; and one or more of expanding or contracting the second leaf according to movement of the lateral adjustment plate and laterally moving the fenestration panel relative to the fenestration frame with the expanding or contracting.

Aspect 26 can include, or can optionally be combined with the subject matter of Aspects 1-25 to optionally include wherein moving the elevation adjustment pin includes rotating the elevation adjustment pin relative to the first leaf and changing the elevation of a bearing surface of the elevation adjustment pin according to the rotation, the bearing surface coupled with the second leaf.

Aspect 27 can include, or can optionally be combined with the subject matter of Aspects 1-26 to optionally include wherein changing the elevation of the fenestration panel and the second leaf includes changing the elevation of the fenestration panel and the second leaf according to the change of elevation of the bearing surface.

Aspect 28 can include, or can optionally be combined with the subject matter of Aspects 1-27 to optionally include wherein the first leaf includes an upper first leaf knuckle and a lower first leaf knuckle, and comprising locking the elevation adjustment pin with an elevation lock coupled with the upper first leaf knuckle.

Aspect 29 can include, or can optionally be combined with the subject matter of Aspects 1-28 to optionally include wherein elevation adjustment pin is coupled with the lower first leaf knuckle, and locking the elevation adjustment pin includes distributing a load of the second leaf and the fenestration panel between the upper and lower first leaf knuckles.

Aspect 30 can include, or can optionally be combined with the subject matter of Aspects 1-29 to optionally include wherein moving the lateral adjustment plate includes moving a lateral adjustment jack coupled between the second leaf and the lateral adjustment plate associated with the second leaf.

Aspect 31 can include, or can optionally be combined with the subject matter of Aspects 1-30 to optionally include wherein expanding or contracting the second leaf includes moving the lateral adjustment plate according to movement of the lateral adjustment jack.

Aspect 32 can include, or can optionally be combined with the subject matter of Aspects 1-31 to optionally include positioning a portion of the fenestration hinge assembly, including knuckles of one or more of the first or second leaves, within one or more profiles of the fenestration panel or the fenestration frame, respectively.

Aspect 33 can include, or can optionally be combined with the subject matter of Aspects 1-32 to optionally include wherein positioning the portion of the fenestration assembly within the one or more profiles includes positioning portions of the knuckles within the one or more profiles.

Aspect 34 can include, or can optionally be combined with the subject matter of Aspects 1-33 to optionally include wherein positioning the portion of the fenestration assembly within the one or more profiles includes positioning the knuckles within a hinge cavity of a recessed escutcheon.

Aspect 35 can include, or can optionally be combined with the subject matter of Aspects 1-34 to optionally include wherein one or both of vertically or laterally adjusting the fenestration panel includes vertically or laterally adjusting the fenestration panel while the fenestration panel and the fenestration frame are rotatably coupled with the at least one fenestration hinge assembly.

Each of these non-limiting aspects can stand on its own, or can be combined in various permutations or combinations with one or more of the other aspects.

The above description includes references to the accompanying drawings, which form a part of the detailed description. The drawings show, by way of illustration, specific embodiments in which the invention can be practiced. These embodiments are also referred to herein as "aspects" or "examples." Such aspects or example can include elements in addition to those shown or described. However, the present inventors also contemplate aspects or examples in which only those elements shown or described are provided. Moreover, the present inventors also contemplate aspects or examples using any combination or permutation of those elements shown or described (or one or more features thereof), either with respect to a particular aspects or examples (or one or more features thereof), or with respect to other Aspects (or one or more features thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms “first,” “second,” and “third,” etc. are used merely as labels, and are not intended to impose numerical requirements on their objects.

Geometric terms, such as “parallel”, “perpendicular”, “round”, or “square”, are not intended to require absolute mathematical precision, unless the context indicates otherwise. Instead, such geometric terms allow for variations due to manufacturing or equivalent functions. For example, if an element is described as “round” or “generally round,” a component that is not precisely circular (e.g., one that is slightly oblong or is a many-sided polygon) is still encompassed by this description.

The above description is intended to be illustrative, and not restrictive. For example, the above-described aspects or examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as aspects, examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The claimed invention is:

1. A fenestration hinge assembly comprising:
- a first leaf having one or more first leaf knuckles;
- a second leaf rotatably coupled with the first leaf, the second leaf having one or more second leaf knuckles;
- a hinge including the first and second leaf knuckles rotatably coupled with each other; and
- a recessed escutcheon configured for recessed installation within at least one of a fenestration panel or a fenestration frame of a fenestration assembly, the recessed escutcheon includes:
  - a hinge cavity; and
  - wherein the first and second leaf knuckles are at least partially received within the hinge cavity, and a remainder of the first and second leaf knuckles project outside of the hinge cavity.

2. The fenestration hinge assembly of claim 1, wherein the first and second leaf knuckles at least partially received within the hinge cavity include an interior hinge component of the hinge, and the interior hinge component is received within the hinge cavity.

3. The fenestration hinge assembly of claim 1, wherein the hinge is spaced from a cavity wall of the recessed escutcheon extending around the hinge cavity.

4. The fenestration hinge assembly of claim 1 comprising the fenestration assembly including the fenestration panel rotatably coupled with the fenestration frame with the hinge.

5. The fenestration hinge assembly of claim 4, wherein the first and second leaf knuckles at least partially received within the hinge cavity are recessed from a fenestration exterior surface of one or more of the fenestration frame or the fenestration panel.

6. The fenestration hinge assembly of claim 1 comprising:
- a lateral adjustment plate movably coupled with a remainder of the second leaf, and the lateral adjustment plate is configured to position at least a portion of the second leaf laterally, relative to one of the fenestration frame or the fenestration panel of the fenestration assembly; and
- a lateral adjustment jack movably coupled with the second leaf, and the lateral adjustment jack is configured to move the lateral adjustment plate relative to the remainder of the second leaf.

7. The fenestration hinge assembly of claim 6 wherein the lateral adjustment jack is coupled between the lateral adjustment plate and the remainder of the second leaf; and
- wherein movement of the lateral adjustment jack moves the adjustment plate laterally relative to the remainder of the second leaf and relative to one of the fenestration frame or the fenestration panel of the fenestration assembly.

8. The fenestration hinge assembly of claim 6, wherein movement of the lateral adjustment jack includes one or more of expansion or contraction of the second leaf with relative movement of the adjustment plate relative to the remainder of the second leaf.

9. The fenestration hinge assembly of claim 1, wherein the hinge includes an elevation adjustment pin interconnecting the first and second leaf knuckles, wherein the elevation adjustment pin is configured to position the second leaf vertically relative to the first leaf.

10. The fenestration hinge assembly of claim 9, wherein the elevation adjustment pin includes:
- a bearing surface coupled with the second leaf knuckle; and
- wherein elevation movement of the bearing surface is configured to change the elevation of the second leaf knuckle and second leaf relative to the first leaf knuckle and the first leaf.

11. The fenestration hinge assembly of claim 9, wherein the one or more first leaf knuckles include upper and lower first leaf knuckles, and the elevation adjustment pin includes a support bridge extending between the upper and lower first leaf knuckles.

12. The fenestration hinge assembly of claim 11, wherein the elevation adjustment pin includes a locked configuration, and in the locked configuration the support bridge distributes a load from the second leaf knuckle to each of the upper and lower first leaf knuckles of the first leaf.

13. The fenestration hinge assembly of claim 12 comprising an elevation lock coupled with the upper first leaf knuckle, and in the locked configuration the elevation lock couples with the support bridge, interconnects the elevation adjustment pin with the upper first leaf knuckle, and arrests positioning of the second leaf vertically relative to the first leaf.

14. The fenestration hinge assembly of claim 9, wherein the elevation adjustment pin is coupled with the remainder of the first and second leaf knuckles projecting outside of the hinge cavity.

15. A fenestration assembly comprising:
- a fenestration frame;
- a fenestration panel movably coupled with the fenestration frame; and at least one fenestration hinge assembly coupled between the fenestration frame and the fenestration panel, wherein the at least one fenestration hinge assembly includes:

a first leaf coupled with the fenestration frame, the first leaf having upper and lower first leaf knuckles;

a second leaf coupled with the fenestration panel and rotatably coupled with the first leaf, the second leaf having at least one second leaf knuckle between the upper and lower first leaf knuckles;

a lateral adjustment plate associated with one of the first or second leaves;

an elevation adjustment pin spanning between the upper and lower first leaf knuckles and interconnecting the first and second leaves, wherein the elevation adjustment pin distributes a load of the fenestration panel between the upper and lower first leaf knuckles; and wherein the at least one fenestration hinge assembly includes each of lateral and vertical adjustment configurations:

in the lateral adjustment configuration the lateral adjustment plate is adjusted to expand or contract the associated first or second leaf and laterally move the fenestration panel relative to the fenestration frame; and in the elevation adjustment configuration the elevation adjustment pin is adjusted to vertically position the at least one second leaf knuckle between the upper and lower first leaf knuckles and the fenestration panel vertically relative to the first leaf and the fenestration frame.

16. The fenestration assembly of claim 15, wherein the first leaf is coupled with the fenestration frame and the second leaf is coupled with the fenestration panel in each of the lateral and elevation adjustment configurations.

17. The fenestration assembly of claim 15 comprising a recessed escutcheon, and the first and second leaf knuckles are at least partially received within a hinge cavity of the recessed escutcheon.

18. The fenestration assembly of claim 17, wherein the first and second leaf knuckles are spaced from a cavity wall of the recessed escutcheon extending around the hinge cavity.

19. The fenestration assembly of claim 15 comprising a lateral adjustment jack movably coupled with the lateral adjustment plate and the associated first or second leaf, and in the lateral adjustment configuration the lateral adjustment jack is configured to move the lateral adjustment plate to expand or contract the associated first or second leaf.

20. The fenestration assembly of claim 15, wherein the elevation adjustment pin includes:

a bearing surface coupled with the second leaf knuckle; and wherein elevation movement of the bearing surface is configured to change the elevation of the second leaf knuckle and fenestration panel.

21. The fenestration assembly of claim 20, wherein the elevation adjustment pin is coupled with the first leaf knuckle with a graduated interface, and in the elevation adjustment configuration rotation of the elevation adjustment pin changes the elevation of the elevation adjustment pin and the bearing surface and changes the elevation of the second leaf knuckle and the fenestration panel.

22. The fenestration assembly of claim 15, wherein the one or more first leaf knuckles include upper and lower first leaf knuckles, and the elevation adjustment pin includes a support bridge extending between the upper and lower first leaf knuckles.

23. The fenestration assembly of claim 22, wherein the elevation adjustment pin includes a locked configuration, and in the locked configuration the support bridge distributes a load from the second leaf knuckle to each of the upper and lower first leaf knuckles of the first leaf.

24. The fenestration assembly of claim 23 comprising an elevation lock coupled with the upper first leaf knuckle, and in the locked configuration the elevation lock:

couples with the support bridge;

interconnects the elevation adjustment pin with the upper first leaf knuckle; and and arrests movement of the elevation adjustment pin.

25. A method of adjusting a fenestration assembly comprising:

distributing a load of a fenestration panel between the upper and lower first leaf knuckles of a first leaf coupled with a fenestration frame with an elevation adjustment pin;

vertically adjusting the fenestration panel relative to the fenestration frame, vertically adjusting includes:

moving the elevation adjustment pin relative to the first leaf; and changing an elevation of the fenestration panel and a second leaf of the fenestration hinge assembly according to movement of the elevation adjustment pin, the second leaf coupled with the fenestration panel; and laterally adjusting the fenestration panel relative to the fenestration frame, laterally adjusting includes:

moving a lateral adjustment plate associated with the second leaf of the fenestration hinge assembly; and one or more of expanding or contracting the second leaf according to movement of the lateral adjustment plate and laterally moving the fenestration panel relative to the fenestration frame with the expanding or contracting.

26. The method of claim 25, wherein moving the elevation adjustment pin includes rotating the elevation adjustment pin relative to the first leaf and changing the elevation of a bearing surface of the elevation adjustment pin according to the rotation, the beating surface coupled with the second leaf.

27. The method of claim 26, wherein changing the elevation of the fenestration panel and the second leaf includes changing the elevation of the fenestration panel and the second leaf according to the change of elevation of the bearing surface.

28. The method of claim 25, wherein the first leaf includes an upper first leaf knuckle and a lower first leaf knuckle, and comprising locking the elevation adjustment pin with an elevation lock coupled with the upper first leaf knuckle.

29. The method of claim 28, wherein elevation adjustment pin is coupled with the lower first leaf knuckle, and locking the elevation adjustment pin includes distributing a load of the second leaf and the fenestration panel between the upper and lower first leaf knuckles.

30. The method of claim 25, wherein moving the lateral adjustment plate includes moving a lateral adjustment jack coupled between the second leaf and the lateral adjustment plate associated with the second leaf.

31. The method of claim 30, wherein expanding or contracting the second leaf includes moving the lateral adjustment plate according to movement of the lateral adjustment jack.

32. The method of claim 25 comprising positioning a portion of the fenestration hinge assembly, including knuckles of one or more of the first or second leaves, within one or more profiles of the fenestration panel or the fenestration frame, respectively.

33. The method of claim 32, wherein positioning the portion of the fenestration assembly within the one or more profiles includes positioning portions of the knuckles within the one or more profiles.

34. The method of claim 32, wherein positioning the portion of the fenestration assembly within the one or more profiles includes positioning the knuckles within a hinge cavity of a recessed escutcheon.

35. The method of claim 25, wherein one or both of vertically or laterally adjusting the fenestration panel includes vertically or laterally adjusting the fenestration panel while the fenestration panel and the fenestration frame are rotatably coupled with the at least one fenestration hinge assembly.

* * * * *